(12) United States Patent
Sugiyama

(10) Patent No.: US 10,399,463 B2
(45) Date of Patent: Sep. 3, 2019

(54) VEHICLE SEAT

(71) Applicant: TS TECH CO., LTD., Asaka-shi, Saitama (JP)

(72) Inventor: Shinji Sugiyama, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 15/551,112

(22) PCT Filed: Jan. 29, 2016

(86) PCT No.: PCT/JP2016/052694
§ 371 (c)(1),
(2) Date: Aug. 15, 2017

(87) PCT Pub. No.: WO2016/147712
PCT Pub. Date: Sep. 22, 2016

(65) Prior Publication Data
US 2018/0022235 A1    Jan. 25, 2018

(30) Foreign Application Priority Data

Mar. 18, 2015  (JP) .................................. 2015-054953
Mar. 18, 2015  (JP) .................................. 2015-054959
Mar. 18, 2015  (JP) .................................. 2015-054964

(51) Int. Cl.
*B60N 2/02* (2006.01)
*B60N 2/22* (2006.01)
*B60N 2/90* (2018.01)

(52) U.S. Cl.
CPC ........... *B60N 2/0244* (2013.01); *B60N 2/224* (2013.01); *B60N 2/99* (2018.02);
(Continued)

(58) Field of Classification Search
CPC ........ B60N 2/0244; B60N 2/99; B60N 2/224; B60N 2002/026; B60N 2002/0236; B60N 2002/024
See application file for complete search history.

(56) References Cited

U.S. PATENT DOCUMENTS 9,283,868 B2    3/2016  Sugiyama
2007/0276568 A1*  11/2007  Tozu .................... B60N 2/0244
                                                   701/49
(Continued)

FOREIGN PATENT DOCUMENTS

JP    S6097633 U    7/1985
JP    H0431138 A    2/1992
(Continued)

OTHER PUBLICATIONS

International Search Report for PCT/JP2016/052694, dated Apr. 19, 2016, 5 pages including English translation.
(Continued)

*Primary Examiner* — Rodney A Butler
(74) *Attorney, Agent, or Firm* — Hamre, Schumann, Mueller & Larson, P.C.

(57) ABSTRACT

A vehicle seat comprising: a seat cushion; a seat back; an actuator capable of changing an orientation of the seat back laterally by moving a pressure-receiving member; and a controller configured to exercise control over the actuator. The controller includes a posture control unit configured to execute, during turning of a vehicle, a seat posture control under which the actuator is caused to move the pressure-receiving member from an initial position to an advanced position to cause the seat back to orient toward a turning direction. The posture control unit is configured to activate, when an execution time of the seat posture control has become equal to or greater than an execution time threshold value, a control under which the actuator is caused to move
(Continued)

the pressure-receiving member from the advanced position to an intermediate position to reversely change the orientation of the seat back.

19 Claims, 18 Drawing Sheets

(52) U.S. Cl.
CPC .. *B60N 2002/024* (2013.01); *B60N 2002/026* (2013.01); *B60N 2002/0236* (2013.01)

(56) References Cited

U.S. PATENT DOCUMENTS

| | | |
|---|---|---|
| 2013/0175838 A1 | 7/2013 | Oshima et al. |
| 2013/0241254 A1 | 9/2013 | Sugiyama et al. |
| 2014/0225412 A1 | 8/2014 | Sugiyama |
| 2016/0144743 A1 | 5/2016 | Sugiyama |

FOREIGN PATENT DOCUMENTS

| | | |
|---|---|---|
| JP | 2008049837 A | 3/2008 |
| JP | 2012076545 A | 4/2012 |
| JP | 2013049356 A | 3/2013 |
| JP | 2013049357 A | 3/2013 |
| JP | 2013189141 A | 9/2013 |
| JP | 2013199159 A | 10/2013 |
| JP | 2014019202 A | 2/2014 |
| WO | 2012043807 A1 | 4/2012 |
| WO | 2013031796 A1 | 3/2013 |

OTHER PUBLICATIONS

Office Action issued for Chinese Patent Application No. 201680015099.X, dated Dec. 18, 2018, 9 pages including English translation.

Office Action issued for Japanese Patent Application No. 2015-054959, dated Oct. 23, 2018, 7 pages including English translation.

* cited by examiner (a) INITIAL POSITION (b)

(c) ADVANCED POSITION (a) INITIAL POSITION (b)

(c) ADVANCED POSITION (a)

(b)

VEHICLE SEAT

TECHNICAL FIELD

The present invention relates to a vehicle seat having a capability of changing an orientation of a seat back laterally in accordance with a state of a vehicle making a turn.

BACKGROUND ART

A car seat apparatus configured such that when a vehicle turns, an orientation of a seat back is changed by swiveling a back plate portion of the seat back to orient toward a turning direction so as not to allow the feature of holding an occupant to be impaired due to a lateral acceleration produced in a direction reverse to the turning direction is hitherto known in the art (e.g., Patent Document 1). According to the invention disclosed in the Patent Document 1, a control exercised is such that the lateral acceleration to be imposed on the car is estimated by computation, and when the lateral acceleration exceeds a predetermined threshold value, the orientation of the back plate portion of the seat back is changed.

CITATION LIST

Patent Literature

Patent Document 1: JP 2013-049357 A

SUMMARY OF INVENTION

In such a configuration that when the vehicle turns, the orientation of the seat back is changed to orient toward a turning direction, however, when the vehicle turns for an extended period of time, a long duration of an unusual state of the seat configuration different from the state in normal times would disadvantageously cause an occupant to feel uncomfortable.

It is thus an object of the present invention to provide a vehicle seat that can be made less likely to cause an occupant to feel uncomfortable even when the vehicle turns for an extended period of time.

In order to achieve the above object, a vehicle seat according to the present invention comprises a seat cushion, a seat back, an actuator capable of changing an orientation of a seat back laterally by moving at least part of the seat back, and a controller configured to exercise control over the actuator, wherein the controller includes a posture control unit configured to execute, during turning of a vehicle, a seat posture control under which the actuator is caused to move the at least part of the seat back from an initial position to a first position to cause the seat back to orient toward a turning direction, and wherein the posture control unit is configured to activate, when an execution time of the seat posture control has become equal to or greater than an execution time threshold value, a control under which the actuator is caused to move the at least part of the seat back from the first position to a second position to reversely change the orientation of the seat back.

With this configuration, the orientation of the seat back is reversely changed when the execution time of the seat posture control has become equal to or greater than the execution time threshold value; therefore, even when the vehicle turns for an extended period of time, an occupant can be made less likely to feel uncomfortable.

The vehicle seat as described above may be configured such that the second position is between the initial position and the first position.

With this feature, the occupant can be made less likely to feel uncomfortable with a good hold of the occupant being kept during the turning of the vehicle.

The vehicle seat as described above may be configured such that the controller includes a lateral acceleration acquisition unit configured to acquire a lateral acceleration, and the posture control unit may be configured to activate, when a magnitude of the lateral acceleration acquired by the lateral acceleration acquisition unit during the turning of the vehicle has become equal to or greater than a first threshold value, a control under which the actuator is caused to move the at least part of the seat back from the initial position to the first position.

In the vehicle seat as described above, the posture control unit may be configured to activate, when a magnitude of the lateral acceleration acquired by the lateral acceleration acquisition unit during the seat posture control has become equal to or smaller than a second threshold value that is smaller than the first threshold value, a control under which the actuator is caused to move the at least part of the seat back to the initial position to thereby bring the seat posture control to an end.

In the vehicle seat as described above, the posture control unit may be configured such that a motion from the first position to the second position is produced with a speed slower than a speed of a motion from the initial position to the first position as produced during startup of the seat posture control.

In the vehicle seat as described above, the posture control unit may be configured such that a motion from the first position to the second position is produced with a speed slower than a speed of a motion to the initial position as produced during a process of bringing the seat posture control to an end.

The vehicle seat as described above may further comprise a pressure-receiving member provided to receive a load from an occupant, the pressure-receiving member being disposed between left and right side frames that constitute left and right frames of the seat back, wherein the actuator is configured to change the orientation of the seat back laterally by moving the pressure-receiving member.

The vehicle seat as described above may be configured such that the seat back includes a central portion allowing a back of an occupant to rest thereagainst, and side portions disposed at left and right sides of the central portion and jutting frontward farther than the central portion, wherein a gap formed between the central portion and one of the side portions is greater when the pressure-receiving member is in the second position than when the pressure-receiving member is in the first position.

With this configuration, an upper body of the occupant can be supported adequately in this gap. Therefore, the stability of the upper body of the occupant during the seat posture control can be improved.

The vehicle seat as described above may be configured such that an amount of actuation of the actuator between the initial position and the second position is half an amount of actuation of the actuator between the initial position and the first position.

The vehicle seat as described above may be configured such that the posture control unit is configured to reversely change the orientation of the seat back stepwise in accordance with a lapse of the execution time of the seat posture control.

DESCRIPTION OF EMBODIMENTS

First Embodiment

Hereafter, a first embodiment of the present invention will be described in detail with reference made to the drawings where appropriate. In the following description, a mechanical setup of a vehicle seat as one example of a vehicle seat will be discussed at the outset, and then a configuration for control implemented in a posture control mechanism will be discussed.

\<Mechanical Setup of Car Seat\>

Figure 1:
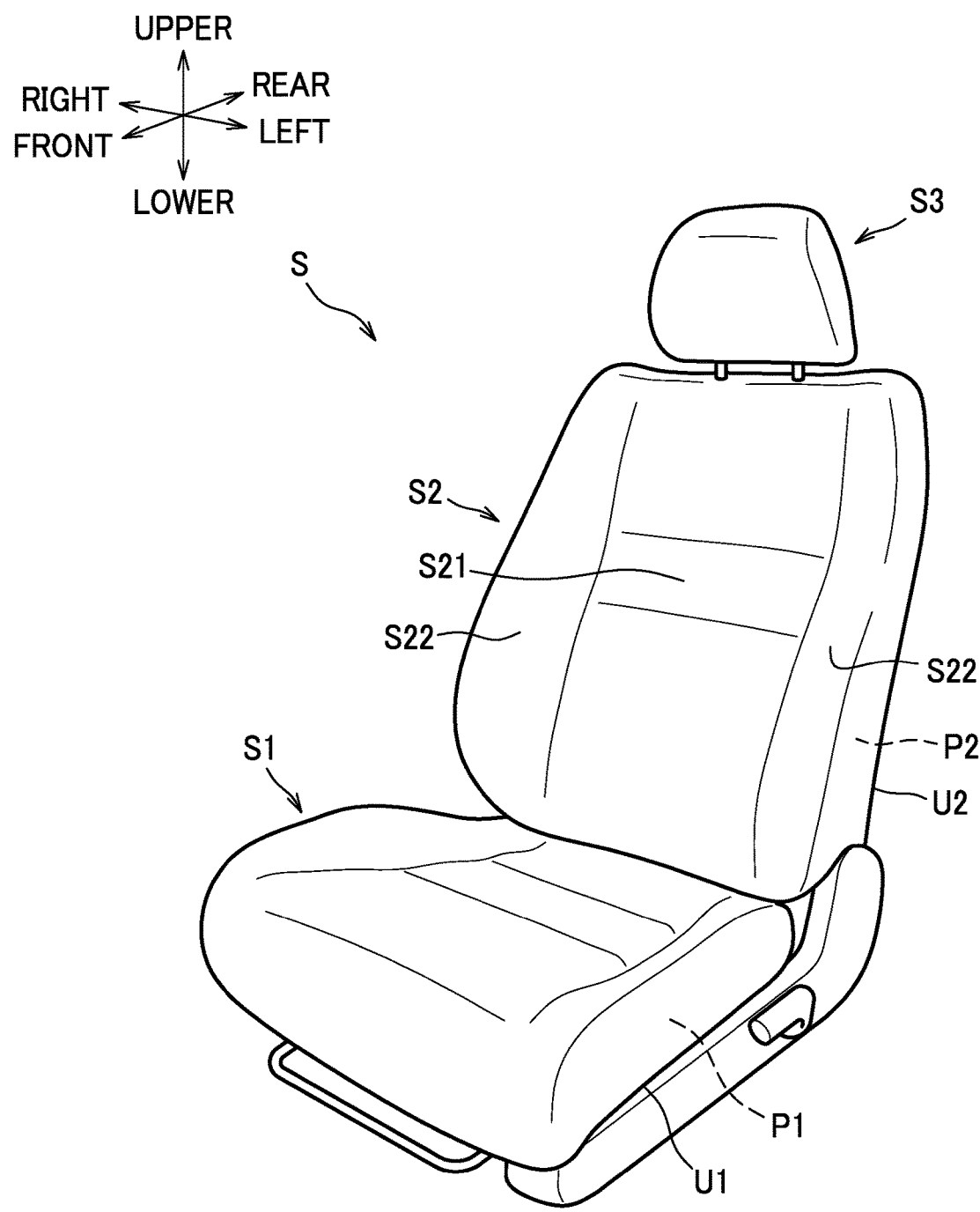
FIG. 1 is a perspective view of a car seat as an example of a vehicle seat according to an embodiment of the present invention.

As shown in FIG. 1, a car seat S, which is a seat for use in a driver's seat of an automobile, mainly comprises a seat cushion S1, a seat back S2, and a headrest S3. The seat back S2 includes a central portion S21 allowing a back of an occupant to rest thereagainst, and side portions S22 disposed at left and right sides of the central portion S21 and jutting frontward farther than the central portion S21. It is to be understood that the car seat S may be installed not only in the driver's seat, but also in the passenger seat next to the driver's seat, a rear seat, or any other seat locations.

Figure 2:
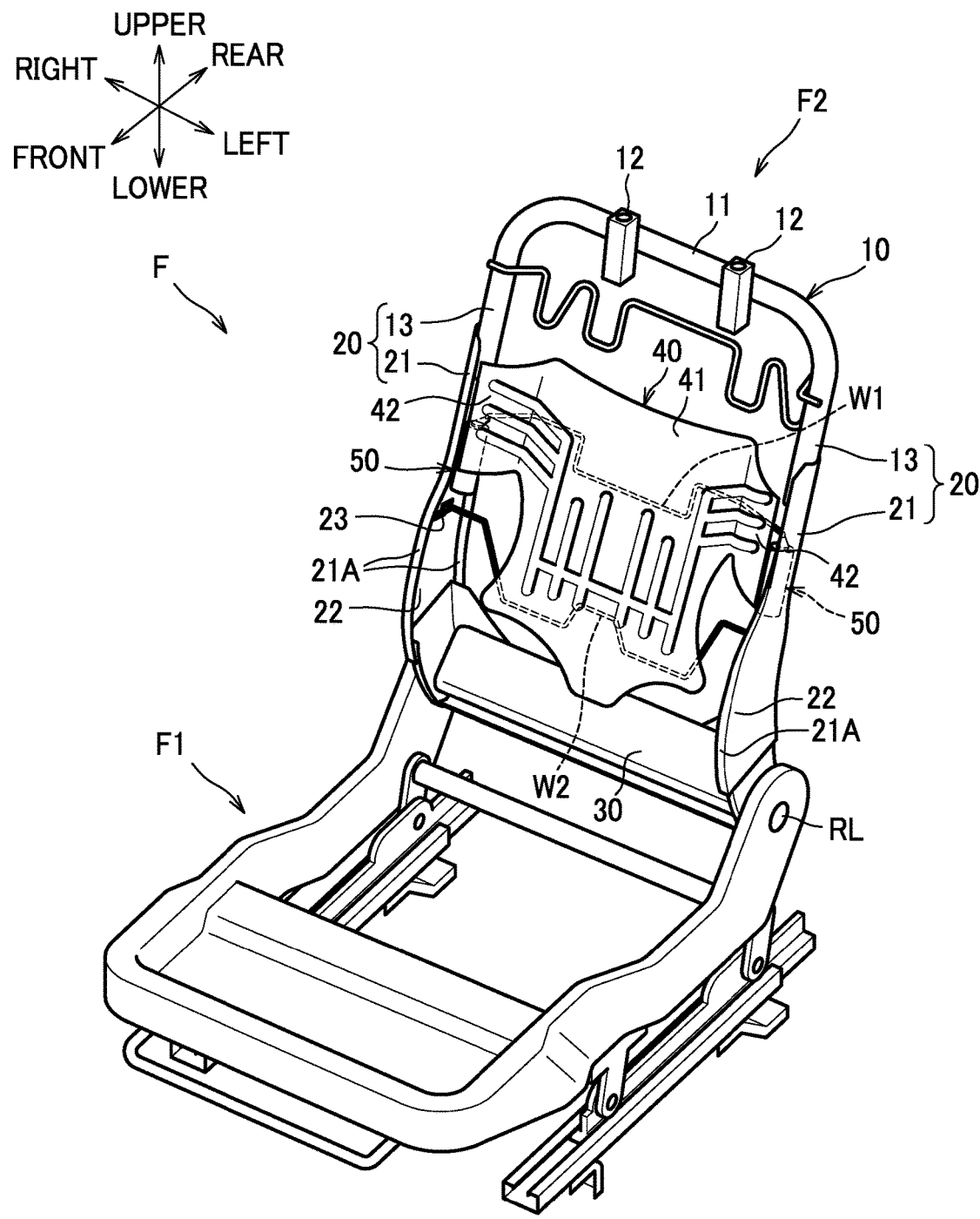
FIG. 2 is a perspective view of a seat frame incorporated in the car seat.

The seat cushion S1 and the seat back S2 incorporate a seat frame F as shown in FIG. 2. The seat frame F is composed mainly of a seat cushion frame F1 constituting a frame of the seat cushion S1, and a seat back frame F2 constituting a frame of the seat back S2. The seat cushion S1 is formed by upholstering the seat cushion frame F1 with a seat cushion pad P1 made of a cushiony material such as urethane foam, and an outer covering U1 made of synthetic leather, fabric or the like. The seat back S2 is formed by upholstering the seat back frame F2 with a seat back pad P2 made of a cushiony material, and an outer covering U2 made of synthetic leather, fabric or the like (see also FIG. 1).

The seat back frame F2 has a lower portion thereof pivotally connected via a reclining mechanism RL to a rear portion of the seat cushion frame F1. This allows the seat back S2 to be tilted frontward and rearward relative to the seat cushion S1.

It is to be noted that the directions in this description, i.e., front/rear (frontward/rearward), left/right (leftward/rightward; lateral) and upper/lower (upward/downward), are designated with reference to an occupant seated on the car seat S in its unreclined position such that the seat back S2 is not tilted down by means of the reclining mechanism RL.

The seat back frame F2 is configured to mainly include an upper frame 10, left and right side frames 20 and a lower frame 30, and formed in the shape of a picture frame with the upper frame 10, the left and right side frames 20 and the lower frame 30 welded or otherwise joined together in one piece.

The upper frame 10 is formed by bending a metal pipe material in a substantially U-shaped configuration, and includes a lateral pipe portion 11 on which are fixed support brackets 12 for use in attaching the headrest S3 thereto. The upper frame 10 further includes left and right vertical pipe portions 13 of which lower portions are connected to upper portions of side frame main body portions 21 respectively so that the left and right vertical pipe portions 13 together with the side frame main body portions 21 constitute the side frames 20.

The side frame main body portions 21 are made of stamped or otherwise formed sheet metal. The side frame main body portions 21 include bulging portions 22 provided at their lower portions and jutting frontward farther than their upper portions to form side portions S22 of the seat back S2.

At an inside of this seat back frame F2 shaped like a picture frame, a pressure-receiving member 40 configured to support a back of an occupant and a posture control mechanism 50 configured to change an orientation of the pressure-receiving member 40 laterally (to the left and to the right) are arranged.

The pressure-receiving member 40 is an elastically deformable plate member made of plastic or the like, and is disposed rearward of an occupant between the left and right side frames 20. To be more specific, the pressure-receiving member 40 includes a pressure-receiving portion 41 for supporting the back of an occupant through the seat back pad P2 and the like, and support portions 42 protruding from left and right ends of an upper portion of the pressure-receiving portion 41 in laterally-outward-and-frontward directions. The pressure-receiving portion 41 is located in a position rearward of the central portion S21 of the seat back S2, while the support portions 42 are located in positions rearward of the side portions S22. The support portions 42 serve to support an upper portion of the upper body of the occupant from left and right sides.

The pressure-receiving member 40 is engaged with, and supported by an upper connecting wire W1 and a lower connecting wire W2 which are disposed rearward of the pressure-receiving member 40. The upper connecting wire W1 has its both end portions engaged with and supported by the posture control mechanisms 50, and the lower connecting wire W2 has its both end portions engaged with and supported by wire mount portions 23 provided at laterally inner sides of the left and right side frames 20.

The posture control mechanism 50 is disposed at each of left and right sides of the pressure-receiving member 40, and configured to be capable of changing an orientation of the seat back S2 laterally by moving the pressure-receiving member 40 that is part of the seat back S2 under control of a controller 100 (see FIG. 6) which will be described later.

Figure 3:
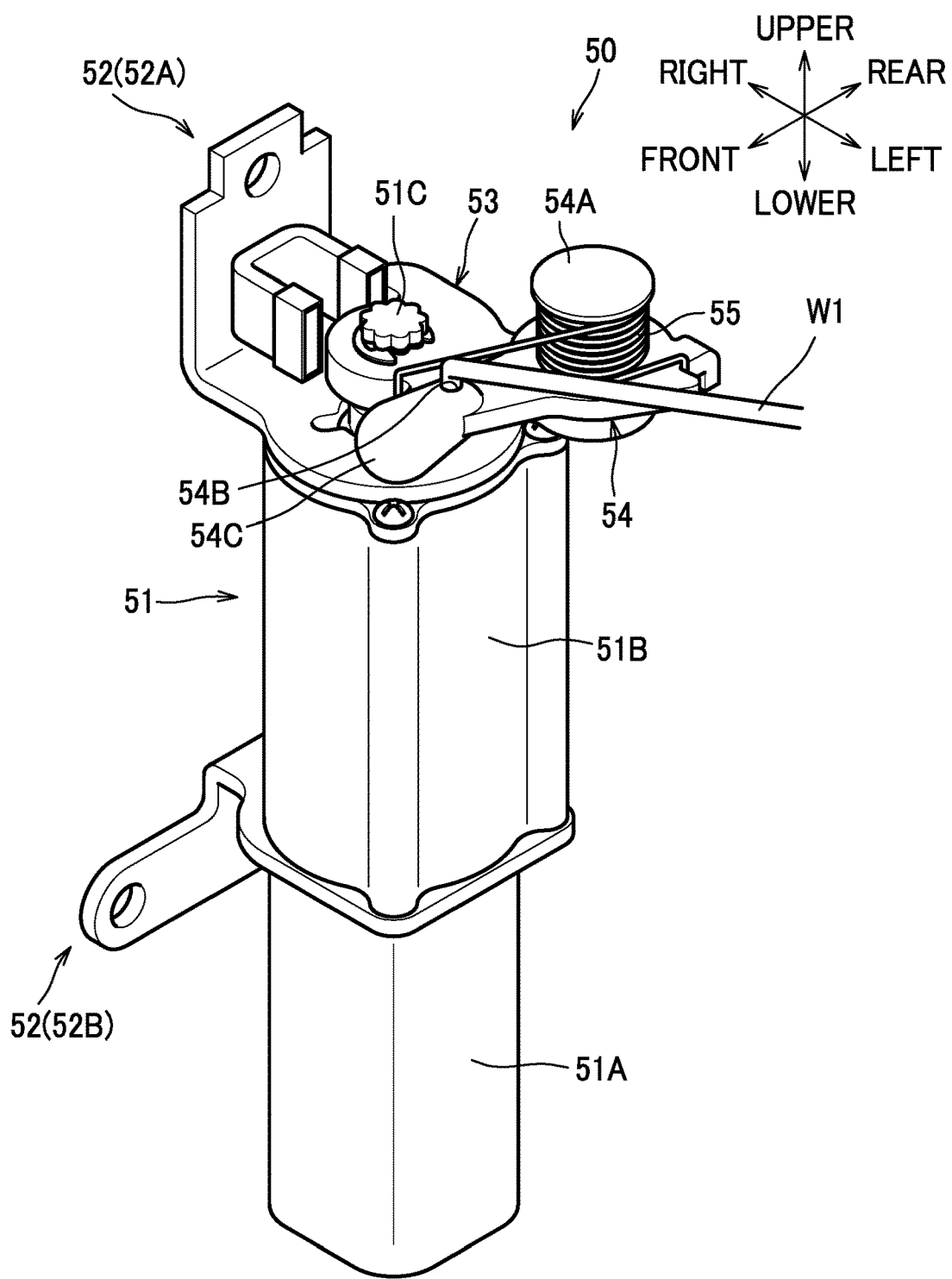
FIG. 3 is an enlarged perspective view of a posture control mechanism according to a first embodiment.

As shown in FIG. 3, the posture control mechanism 50 mainly includes an actuator 51, a retaining bracket 52 (52A, 52B), a first link member 53, a second link member 54, and a torsion spring 55.

The actuator 51 is a source of driving power for causing the first link member 53 and the second link member 54 to swing, including a stepping motor 51A that can be rotated in normal and reverse directions, a gear box 51B, and an output shaft 51C, which are arranged in such a manner that the output shaft 51C is positioned to have its axial direction aligned with an upward-downward direction. The actuator 51 is fixed to the side frame 20 by the retaining bracket 52. The driving power from the stepping motor 51A is transmitted with a speed reduced in the gear box 51B, to the output shaft 51C, to cause the output shaft 51C to rotate.

The first link member 53 is an elongated plate member, and has one end portion thereof fixed to the output shaft 51C of the actuator 51, so that the other end portion thereof can be swung on the output shaft 51C frontward and rearward.

The second link member 54 has one end portion pivotally connected to the other end portion of the first link member 53 via a pin 54A so that the second link member 54 can swing relative to the first link member 53. At the other end portion of the second link member 54, a connecting hole 54B in which the end portion of the aforementioned upper connecting wire W1 is pivotally engaged, and a plastic contact portion 54C configured to contact the pressure-receiving member 40 are formed.

The torsion spring 55 has one end thereof engaged with the first link member 53 and the other end thereof engaged with the second link member 54, to thereby bias and press the second link member 54 in a clockwise direction as viewed from above against the first link member 53.

In the description given herein, the right posture control mechanism 50 shown in FIG. 3 has been described, and it is to be understood that the left posture control mechanism 50 is laterally symmetric to the right posture control mechanism 50.

Figure 4:
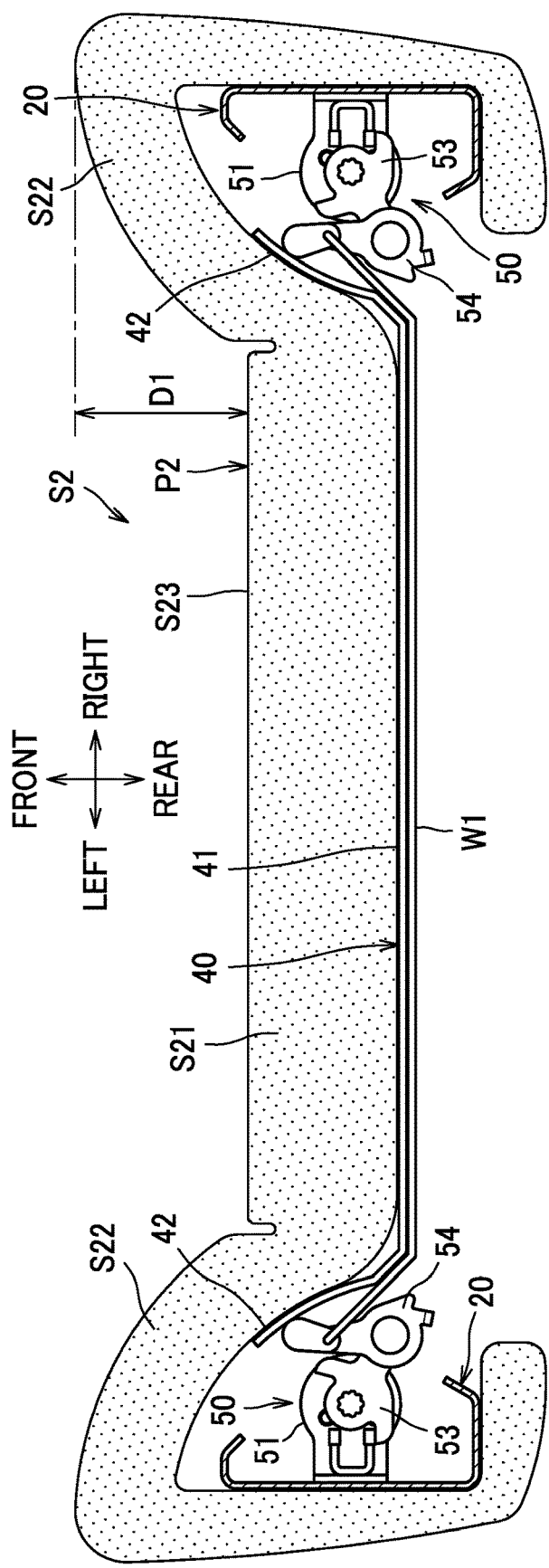
FIG. 4 is a sectional view of a seat back for showing operations of the posture control mechanism and a pressure-receiving member, in which the pressure-receiving member is in an initial position.

As shown in FIG. 4, the pressure-receiving member 40 in normal times is oriented frontward, i.e., located in the initial position. In this state, a support surface S23 provided on the seat back S2 to support an occupant is oriented frontward, too.

Figure 5:
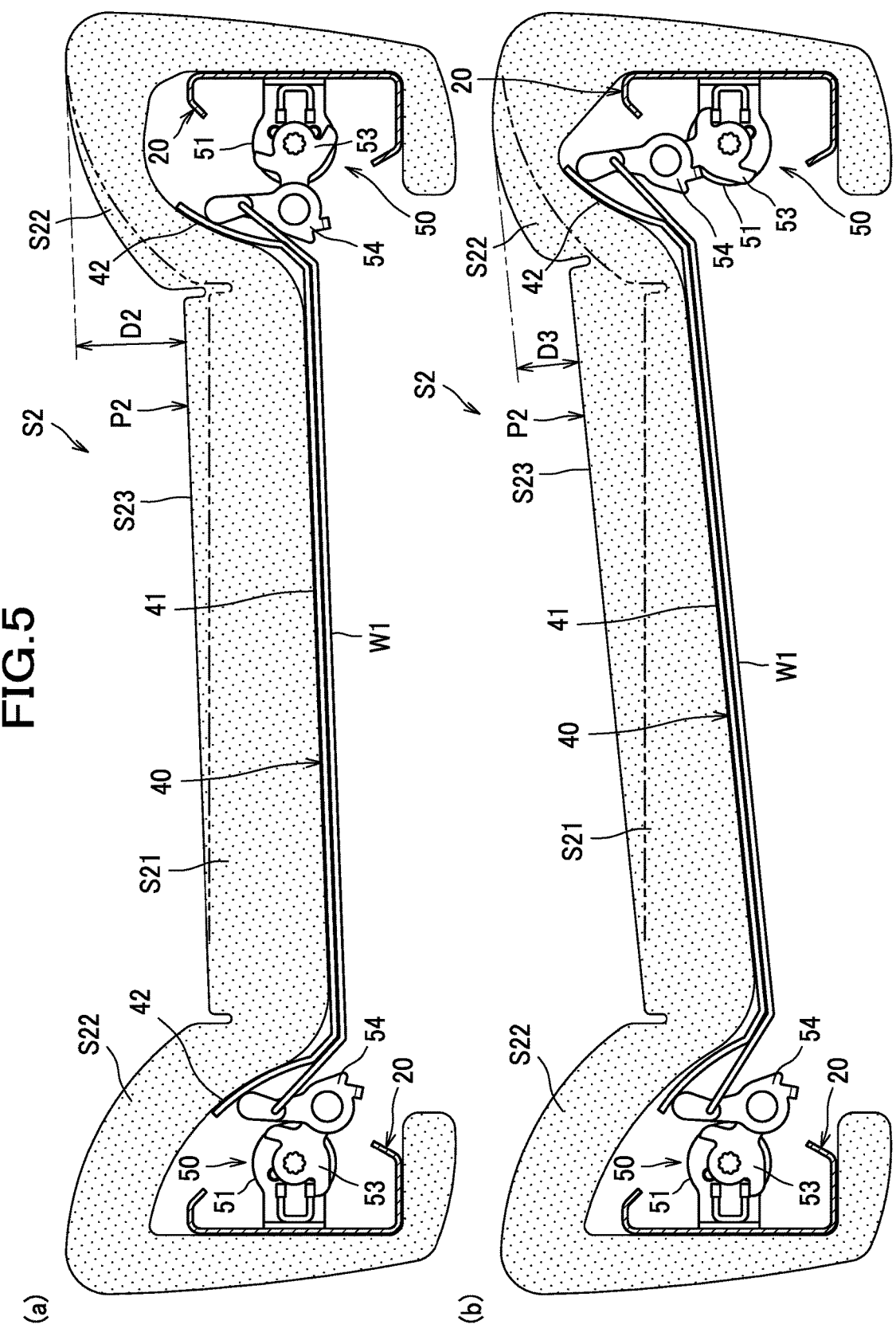
FIG. 5 includes sectional views of the seat back for showing the operations of the posture control mechanism and the pressure-receiving member: a view (a) in which the pressure-receiving member is in an intermediate position, and a view (b) in which the pressure-receiving member is in an advanced position.

For example, when the car (vehicle) turns left, the stepping motor 51A of the right posture control mechanism 50 rotates in the normal direction under the control of the controller 100, the first link member 53 swings frontward, and the second link member 54 swings, so that the right end portion of the pressure-receiving member 40 moves from its initial position frontward. Accordingly, the right end portion of the pressure-receiving member 40 moves through an intermediate position as an example of a second position as shown in FIG. 5(a) to an advanced position as an example of a first position as shown in FIG. 5(b), so that the pressure-receiving member 40 as a whole is caused to orient leftward (i.e., toward a turning direction). As the seat back pad P2 is pushed out by the right end portion of the pressure-receiving member 40, the support surface S23 of the seat back S2 is caused to orient leftward, as well. In this state, a gap D3 formed between the central portion S21 and the right side portion S22 of the seat back S2 has become smaller than a gap D1 formed therebetween when the pressure-receiving member 40 is in the initial position.

On the other hand, when the orientation of the seat back S2 is reversely changed, the stepping motor 51A of the right posture control mechanism 50 rotates in the reverse direction under the control of the controller 100, the first link member 53 swings rearward, and the second link member 54 swings, so that the right end portion of the pressure-receiving member 40 moves from the advanced position rearward. Accordingly, the right end portion of the pressure-receiving member 40 moves through the intermediate position as shown in FIG. 5(a) to the initial position as shown in FIG. 4, so that the pressure-receiving member 40 as a whole is caused to orient frontward. As a result, the support surface S23 of the seat back S2 is caused to orient frontward, as well.

The pressure-receiving member 40 is also configured to be kept in the intermediate position as shown in FIG. 5(a) by stopping the rotation of the stepping motor 51A halfway under the control of the controller 100. The intermediate position is between the initial position as shown in FIG. 4 and the advanced position as shown in FIG. 5(b). In the present embodiment, by way of example, an amount of actuation of the actuator 51 between the initial position and the intermediate position is set to be substantially half an amount of actuation of the actuator 51 between the initial position and the advanced position. When the right end portion of the pressure-receiving member 40 is in the intermediate position, a gap D2 formed between the central portion S21 and the right side portion S22 of the seat back S2 is smaller than the gap D1 formed therebetween when the pressure-receiving member 40 is in the initial position, but is greater than the gap D3 formed therebetween when the pressure-receiving member 40 is in the advanced position.

When the car turns right, the stepping motor 51A of the left posture control mechanism 50 rotates in the normal direction under the control of the controller 100. Subsequent steps of operation are similar to those described above as for the left-turn situation, and thus a detailed description is omitted.

<Configuration for Control of Posture Control Mechanism>

Figure 6:
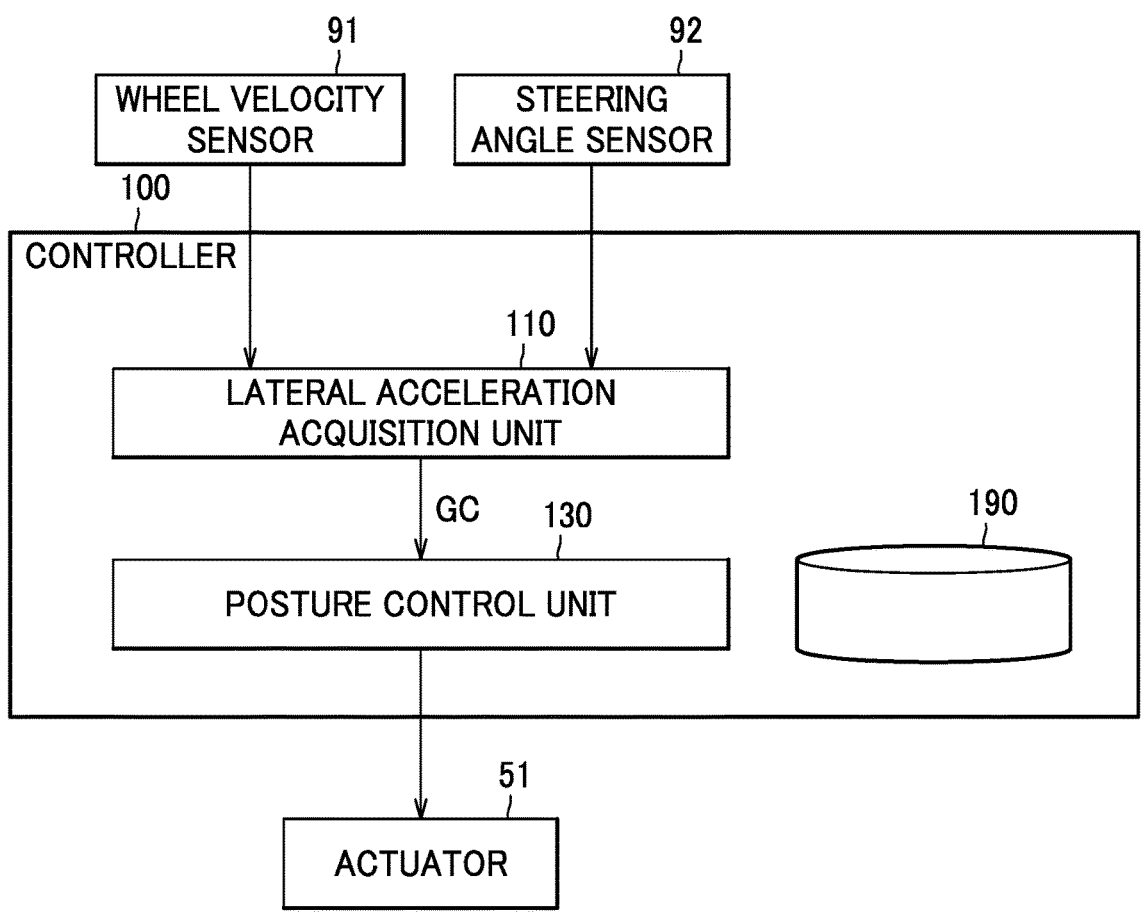
FIG. 6 is a block diagram for explaining a configuration of a controller.

As shown in FIG. 6, the controller 100 mainly includes a lateral acceleration acquisition unit 110, a posture control unit 130, and a storage unit 190, in order to exercise control over actuation of the actuator 51 to move the pressure-receiving member 40, thereby changing the orientation of the seat back S2 laterally (to the left or to the right). The controller 100 includes a CPU (central processing unit), a ROM (read only memory), a RAM (random access memory) and other modules which are not illustrated in the drawings, and implements the respective units by loading and executing relevant programs pre-stored in the storage unit 190.

The lateral acceleration acquisition unit 110 is a unit for acquiring a lateral acceleration imparted to a car, and is configured in the present embodiment to acquire a lateral acceleration by computation based on a car speed and a steering angle. To be more specific, the lateral acceleration acquisition unit 110 may work out a lateral acceleration GC by computation based on a wheel velocity acquired from a wheel velocity sensor 91 and a steering angle acquired from a steering angle sensor 92. As an example, the lateral acceleration GC may be computed using the following equations with a car body velocity V determined from the wheel velocity by a known method and using a stability factor A as a constant specific to the car, a wheel base L of the car, a steering angle φ, and a turning radius R:

$$R=(1+AV^2)/(L/\varphi)$$

$$GC=V^2/R$$

It is to be understood that, in the present embodiment, the steering angle φ is taken from the angle of the steering operation of the steering wheel, but may be taken, for example, from the angle of the turning motion of the car wheel(s) instead if the constants are changed. It is also to be understood that the lateral accelerations GC directed to the right and to the left are represented herein, respectively, by positive and negative values.

The posture control unit 130 is a unit for executing, during turning of the car, a seat posture control under which based on the lateral acceleration GC acquired by the lateral acceleration acquisition unit 110 the actuator 51 is caused to move the pressure-receiving member 40, thereby causing the support surface S23 of the seat back S2 to orient toward the turning direction. To be more specific, the posture control unit 130 is configured to activate the seat posture control when a magnitude (absolute value) of the lateral acceleration GC has become equal to or greater than a first threshold value GCth1; under the seat posture control exercised over the actuator 51, the stepping motor 51A is caused to rotate in the normal direction to thereby cause the pressure-receiving member 40 to move from the initial position as shown in FIG. 4 to the advanced position as shown in FIG. 5(b).

In the present embodiment, each of the threshold values is predetermined through a test driving, simulation, or the like. In describing the present embodiment, it is assumed that GCth1 is a positive value, and when the lateral acceleration GC directed leftward as exhibited in the right-turn is assumed to be negative, the magnitude of the lateral acceleration GC being equal to or greater than the first threshold value GCth1 is represented as GC≤−GCth1.

The posture control unit 130 is configured to reversely change the orientation of the support surface S23 of the seat back S2 when an execution time of the seat posture control has become long, i.e., equal to or greater than a predetermined period of time. To be more specific, the posture control unit 130 is configured to activate a control over the actuator 51, when the execution time TE of the seat posture control (in the present embodiment, by way of example, the execution time refers to the a period of time elapsed since the magnitude of the lateral acceleration GC has become equal to or greater than the first threshold value GCth1) has become equal to or greater than an execution time threshold value TEth, under which control the stepping motor 51A is caused to rotate in the reverse direction to move the pressure-receiving member 40 from the advanced position as shown in FIG. 5(b) to the intermediate position as shown in FIG. 5(a). Accordingly, the orientation of the support surface S23 of the seat back S2 is changed reversely toward the orientation in normal times. To be more specific, the angle formed by the support surface S23 with respect to the front-rear direction becomes an angle which is greater than an angle (=0) formed when the pressure-receiving member 40 is in the initial position, but smaller than an angle formed when the pressure-receiving member 40 is in the advanced position. The execution time threshold value TEth may be set appropriately in accordance with the characteristics of the car, and may for example be on the order of 3.0 secs.

The posture control unit 130 is also configured to bring the seat posture control to an end when the magnitude of the lateral acceleration GC during the seat posture control has become equal to or smaller than a second threshold value GCth2, by activating a control over the actuator 51, under which the stepping motor 51A is caused to rotate in the reverse direction to move the pressure-receiving member 40 from the current position (advanced or intermediate position) to the initial position as shown in FIG. 4.

In the present embodiment, it is assumed that GCth2 is a positive value, and when the lateral acceleration GC is negative, the magnitude of the lateral acceleration GC being equal to or smaller than the second threshold value GCth2 is represented as GC≥−GCth2. The second threshold value GCth2 is set to be a value smaller than the first threshold value GCth1. For example, the first threshold value GCth1 may be on the order of 2.0 m/s², the second threshold value GCth2 may be on the order of 1.0 m/s².

The storage unit 190 is a device configured to store values acquired from the respective sensors, lateral acceleration values computed by the lateral acceleration acquisition unit 110, and set values such as threshold values.

Figure 7:
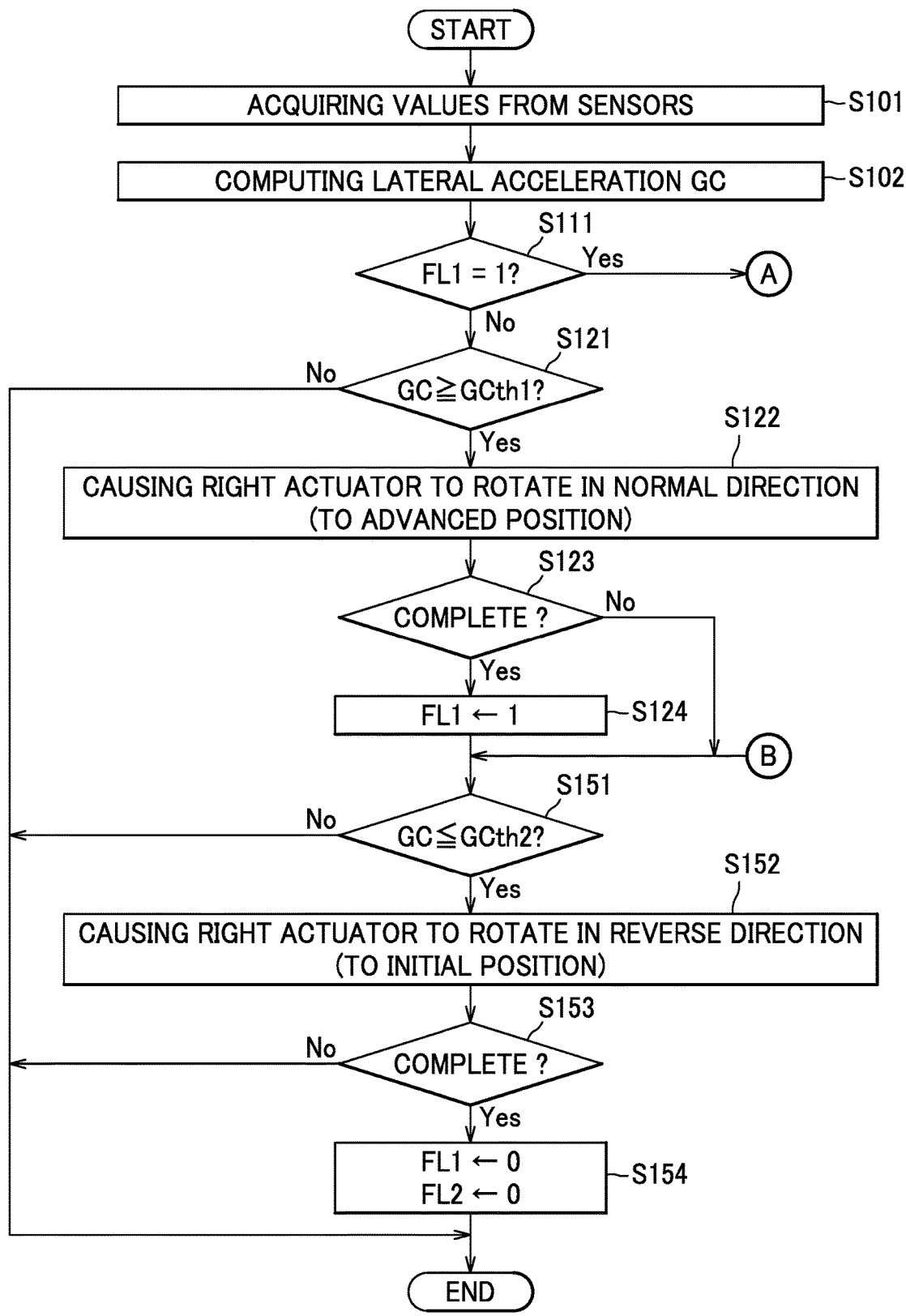
FIG. 7 is a flowchart showing process steps executed in the controller.
Figure 8:
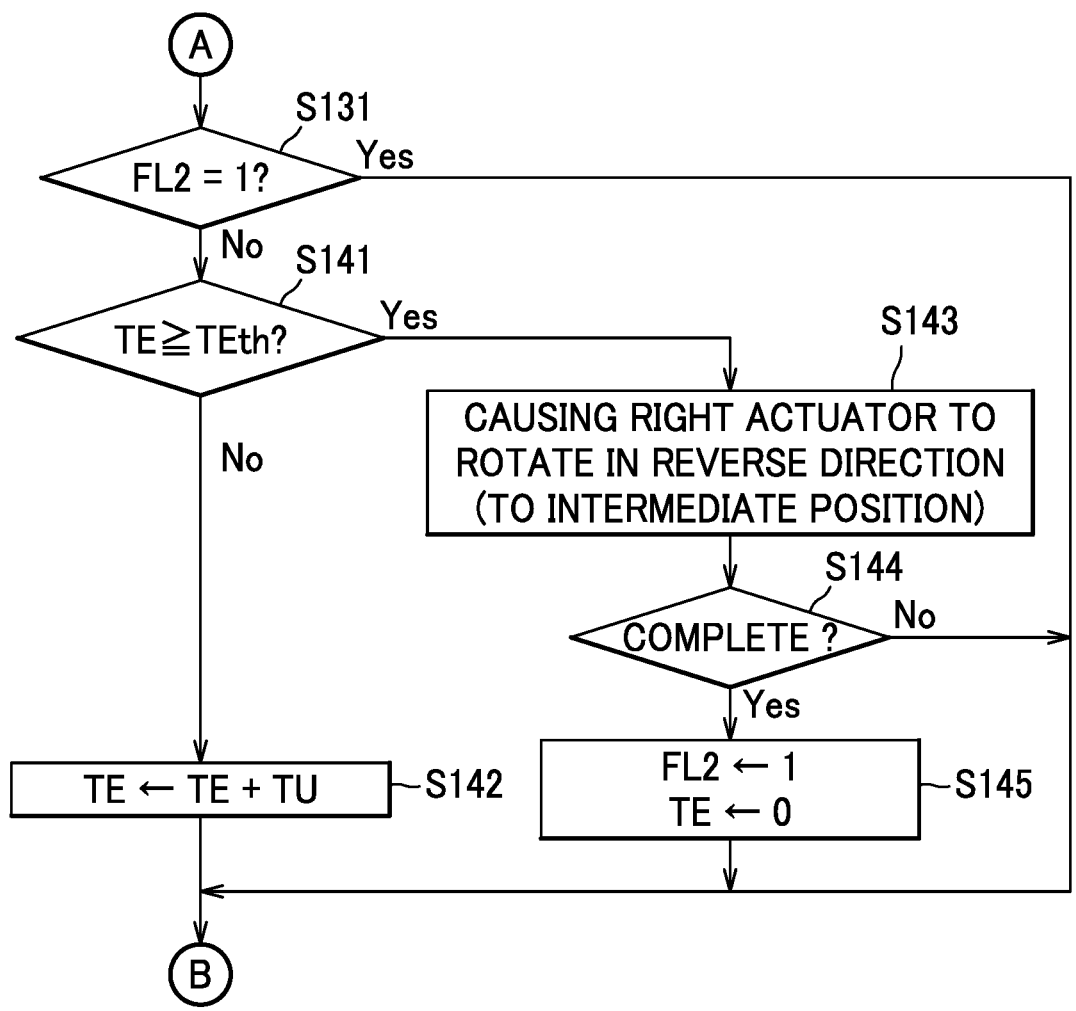
FIG. 8 is a flowchart showing process steps executed in the controller.

Next, one example of process steps executed by the controller 100 will be described with reference to FIGS. 7 and 8. It is to be understood that flowcharts in FIGS. 7 and 8 show the process performed when a car turns left (herein, the lateral acceleration GC is assumed to be positive), in which a series of steps from START to END are executed iteratively for each predetermined control cycle (time interval TU). In a first flag FL1, 0 is set when the seat posture control is not being executed, and 1 is set when the seat posture control is being executed. In a second flag FL2, 1 is set when the pressure-receiving member 40 is in the intermediate position, and 0 is set when it is in any other position. The pressure-receiving member 40 in normal times is in the initial position, and the initial values of the first flag FL1 and the second flag FL2 are 0.

As shown in FIG. 7, the lateral acceleration acquisition unit 110 acquires values from the wheel velocity sensor 91 and the steering angle sensor 92 (S101), and computes a lateral acceleration GC from the acquired wheel velocity and steering angle (S102). The posture control unit 130 then determines whether or not the first flag FL1 is 1 (S111).

If the first flag FL1 is not 1 (i.e., the seat posture control is not being executed) (No in S111), then the posture control unit 130 determines whether or not the magnitude of the lateral acceleration GC is equal to or greater than the first threshold value GCth1 (S121). If the magnitude of the lateral acceleration GC is not equal to or greater than the first threshold value GCth1 (No in S121), then the posture control unit 130 brings the current control cycle to an end.

On the other hand, in step S121, if the magnitude of the lateral acceleration GC is equal to or greater than the first threshold value GCth1 (Yes in S121), then the posture control unit 130 causes the right actuator 51 (stepping motor 51A) to rotate in the normal direction, to move the pressure-receiving member 40 from the initial position (see FIG. 4) to the advanced position (see FIG. 5(b)) (S122). When the motion to the advanced position is completed (Yes in S123), then the posture control unit 130 sets 1 in the first flag FL1 (S124), and proceeds to step S151.

In step S111, if the first flag FL1 is 1 (i.e., the seat posture control is being executed) (Yes in S111), then as shown in FIG. 8, the posture control unit 130 determines whether or not the second flag FL2 is 1 (S131).

If the second flag FL2 is not 1 (i.e., the pressure-receiving member 40 is in the advanced position) (No in S131), then the posture control unit 130 determines whether or not the execution time TE of the seat posture control is equal to or greater than the execution time threshold value TEth (S141). If the execution time TE is not equal to or greater than the execution time threshold value TEth (No in S141), then the posture control unit 130 adds a time TU to the execution time TE to increment the execution time TE (S142), and proceeds to step S151. On the other hand, in step S141, if the execution time TE is equal to or greater than the execution time threshold value TEth (Yes in S141), then the posture control unit 130 causes the right actuator 51 (stepping motor 51A) to rotate in the reverse direction, to move the pressure-receiving member 40 from the advanced position (see FIG. 5(b)) to the intermediate position (see FIG. 5(a)) (S143). When the motion to the intermediate position is completed (Yes in S144), then the posture control unit 130 sets 1 in the second flag FL2 and resets the execution time TE to 0 (S145), and proceeds to step S151.

In step S131, if the second flag FL2 is 1 (i.e., the pressure-receiving member 40 is in the intermediate position) (Yes in S131), then the posture control unit 130 proceeds to step S151.

Referring back to FIG. 7, in step S151, the posture control unit 130 determines whether or not the magnitude of the lateral acceleration GC is equal to or smaller than the second threshold value GCth2 (S151). If the magnitude of the lateral acceleration GC is not equal to or smaller than the second threshold value GCth2 (No in S151), then the posture control unit 130 brings the current control cycle to an end.

On the other hand, if the magnitude of the lateral acceleration GC is equal to or smaller than the second threshold value GCth2 (Yes in S151), then the posture control unit 130 causes the right actuator 51 to rotate in the reverse direction, to move the pressure-receiving member 40 from the advanced position or the intermediate position to the initial position (S152). When the motion to the initial position is completed (Yes in S153), then the posture control unit 130 resets the first flag FL1 and the second flag FL2 to 0 (S154), and brings the current control cycle to an end.

It is to be understood that when the car turns right (herein, the lateral acceleration GC is assumed to be negative), the positive or negative (plus or minus) sign represented as well as the left or right actuator 51 used is opposite to those represented or used when the car turns left as described above. To be more specific, in step S121, if $GC \leq -GCth1$, then it is understood that the magnitude of the lateral acceleration GC is equal to or greater than the first threshold value GCth1, while if not $GC \leq -GCth1$, then it is understood that the magnitude of the lateral acceleration GC is not equal to or greater than the first threshold value GCt1. Also, in step S151, if $GC \geq -GCth2$, then it is understood that the magnitude of the lateral acceleration GC is equal to or smaller than the second threshold value GCth2, while if not $GC \geq -GCth2$, then it is understood that the magnitude of the lateral acceleration GC is not equal to or smaller than the second threshold value GCth2. When the car turns right, the left actuator 51 is caused to rotate in the normal or reverse direction.

Referring now to the drawings, a description will be given of an operation and effects of the present embodiment described above.

Figure 9:
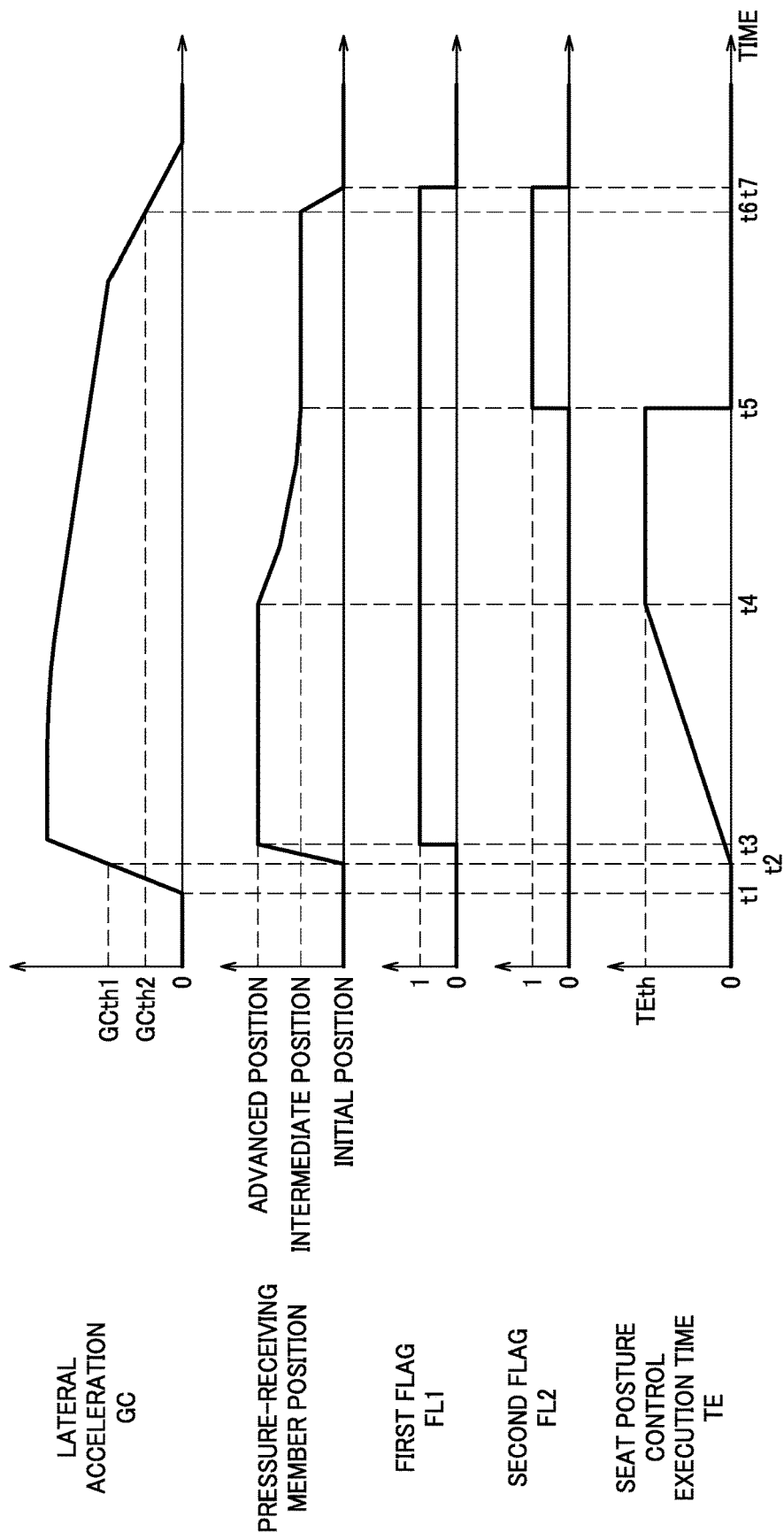
FIG. 9 is a timing chart showing a lateral acceleration, a position of the pressure-receiving member, respective flags, and a seat posture control execution time, during a travel of a car.

As shown in FIG. 9, when the car begins to turn, for example, to the left, from the normal-time state in which the pressure-receiving member 40 is in an initial position (see FIG. 4), the lateral acceleration GC as generated toward rightward increases from then (time t1). When the magnitude of the lateral acceleration GC has become equal to or greater than the first threshold value GCth1 (time t2), the controller 100 starts a seat posture control under which the right actuator 51 is caused to rotate in the normal direction, and the right end portion of the pressure-receiving member 40 is caused to move from the initial position to the advanced position (see FIG. 5(b)) for a period (time t2 through time t3), to cause the support surface S23 of the seat back S2 to orient toward the left that is a turning direction. Accordingly, a good hold of the occupant can be kept during the turning of the car.

Thereafter, when the execution time TE of the seat posture control has become equal to or greater than the execution time threshold value TEth (time t4), the controller 100 causes the right actuator 51 to rotate in the reverse direction, and causes the right end portion of the pressure-receiving member 40 to move from the advanced position to the intermediate position (see FIG. 5(a)) for a period (time t4 through time t5), to reversely change the orientation of the support surface S23 of the seat back S2. With this operation, even if the time for turning of the car becomes longer, the state of the seat configuration significantly different from that exhibited in the normal time is prevented from continuing, so that the occupant can be made less likely to feel uncomfortable.

In the present embodiment, when the pressure-receiving member 40 is moved from the advanced position shown in FIG. 5(b) to the intermediate position shown in FIG. 5(a) so as to reversely change the orientation of the support surface S23 of the seat back S2, the gap D2 formed between the central portion S21 and the right side portion S22 of the seat back S2 becomes greater than the gap D3 formed therebetween when the pressure-receiving member 40 is in the advanced position (i.e., the gap getting restored), so that the upper body of an occupant can be supported adequately in this gap D2. Accordingly, the stability of the upper body of the occupant during the turning (during the seat posture control) can be improved.

In the present embodiment, as the intermediate position is between the initial position and the advanced position, the occupant can be made less likely to feel uncomfortable with a good hold of the occupant being kept during the turning of the vehicle, in comparison with an alternative configuration in which when the execution time TE of the seat posture control is elapsed for a long time, the pressure-receiving member is moved from the advanced position to the initial position to reversely change the orientation of the seat back.

Referring back to FIG. 9, as the car is getting shifted from the turning state toward the straight-traveling state, the lateral acceleration GC decreases accordingly. When the magnitude of the lateral acceleration GC has become equal to or smaller than the second threshold value GCth2 (time t6), the controller 100 causes the right actuator 51 to rotate in the reverse direction, to cause the right end portion of the pressure-receiving member 40 to move from the intermediate position to the initial position for a period (time t6 through time t7), and causes the support surface S23 of the seat back S2 to orient frontward, thereby bringing the seat posture control to an end.

Although the time for which the actuator 51 is caused to move the pressure-receiving member 40 (i.e. rotation speed of the stepping motor 51A) may be set appropriately in accordance with the characteristics of the car or the like, the motion from the advanced position to the intermediate position may preferably be produced with a longer period of time expended therefor, i.e., with a slower speed, than the motion from the initial position to the advanced position (motion produced during startup of the seat posture control), or the motion from the advanced or intermediate position to the initial position (motion produced during a process of bringing the seat posture control to an end). To be more specific, the motion during startup of the seat posture control or during the process for bringing the seat posture control to an end may preferably be produced in such a manner that the orientation of the pressure-receiving member 40 is changed swiftly, while the motion from the advanced position to the intermediate position may preferably be produced in such a manner that the orientation of the pressure-receiving member 40 is changed gradually.

Second Embodiment

Hereafter, a second embodiment of the present invention will be described in detail with reference made to the drawings where appropriate. In the following description, for the same components as those of the previously described embodiment, the same reference characters as used in the previously described embodiment are assigned, and a description thereof will be omitted.

Among vehicle seats for use in an automobile or the like, disclosed in JP 2013-199159 A is one which comprises left and right side frames, a pressure-receiving member disposed between the left and right side frames, and rocking mechanisms disposed at left and right sides of the pressure-receiving member. The rocking mechanisms each include an actuator and a link member, and are configured such that the actuator driven causes the link member to pivot and causes the left end portion or the right end portion of the pressure-receiving member to swing frontward and rearward. In this technical scheme, the link member is disposed in contact with the pressure-receiving member, so that a load applied from an occupant to the pressure-receiving member can be received adequately by the link member.

There is apprehension that the contact of the link member with the pressure-receiving member would possibly cause wear of the link member and the pressure-receiving member, and the load applied from the pressure-receiving member to the link member would possibly encumber the motion of the link member.

With this in view, it is an object of the present embodiment to provide a vehicle seat in which wear of the members can be reduced and the link member can be operated smoothly.

It is another object to improve the stability of an occupant.

It is still another object to improve ride comfort as well as to absorb shock.

As shown in FIG. 1, a vehicle seat according to the present embodiment is configured as a car seat S for use in a driver's seat of an automobile, or the like, and mainly comprises a seat cushion S1, a seat back S2, and a headrest S3.

The seat cushion S1 and the seat back S2 incorporate a seat frame F as shown in FIG. 2. The seat frame F is composed mainly of a seat cushion frame F1 and a seat back frame F2.

The seat back frame F2 is configured to mainly include an upper frame 10, left and right side frames 20 that constitute left and right frames of the seat back S2, and a lower frame 30.

The upper frame 10 is comprised of a pipe material bent in a substantially U-shaped configuration, and includes a lateral pipe portion 11 extending in a lateral direction, on which support brackets 12 for use in attaching the headrest S3 thereto are fixed by welding. The upper frame 10 further includes left and right vertical pipe portions 13 extending in an upward-downward direction; the left and right vertical pipe portions 13 and left and right side frame main body portions 21 (joined to the lower portions of the left and right vertical pipe portions 13) are respectively welded or otherwise joined together in one piece to constitute the left and right side frames 20.

The left and right side frame main body portions 21 are disposed opposite to each other in the lateral direction. Each of the side frame main body portions 21 is formed by sheet-metal stamping process or the like to have a substantially U-shaped configuration in cross section (having a pair of front and rear bent portions 21A formed by bending front and rear end portions in laterally inner directions, the front and rear end portions being located adjacent to two opposite ends facing in the front and rear directions that are parallel to a direction of a shorter dimension of the side frame main body portions 21). Each of the side frame main body portions 21 is formed to include an upper portion configured to envelop and hold the corresponding vertical pipe portion 13 and joined to the vertical pipe portion 13, and a lower portion provided with a bulging portion 22 jutting frontward farther than the upper portion.

A pressure-receiving member 40 and a pair of left and right posture control mechanisms 50 (actuator mechanisms) are disposed between the left and right side frames 20. The car seat S includes a controller 100 (see FIG. 10) for exercising control over the posture control mechanisms 50; the controller 100 may be disposed inside or outside of the car seat S.

The pressure-receiving member 40 is a plate member configured to receive a load from an occupant seated on the car seat S through an outer covering and a cushiony material, and is formed of plastic or the like with elastically deformable property. The pressure-receiving member 40 includes a pressure-receiving portion 41 and left and right support portions 42 formed integrally in one piece, of which the pressure-receiving portion 41 is disposed in a laterally central position to face the back of the occupant, and the support portions 42 protruding from upper portions of left and right ends of the pressure-receiving portion 41 laterally outward and frontward (in obliquely-laterally-outward-and-frontward directions).

The pressure-receiving member 40 is connected to the left and right side frames 20 via an upper connecting wire W1 and a lower connecting wire W2 in such a manner that the pressure-receiving member 40 is movable frontward and rearward relative to the left and right side frames 20. The upper connecting wire W1 as a connecting wire has its both ends connected to the posture control mechanisms 50 fixed to the side frames 20, respectively, so that the upper connecting wire W1 runs between the left and right side frames 20. The upper connecting wire W1 is disposed along an upper region of a back surface of the pressure-receiving member 40 and held by engagement of engageable claws (not shown) formed at the upper region of the rear surface of the pressure-receiving member 40 with the upper connecting wire W1, to thereby establish connection between the upper region of the pressure-receiving member 40 and the left and right side frames 20. The lower connecting wire W2 has its both ends connected to wire mount portions 23 (only one illustrated) provided on the side frames 20, respectively, so that the lower connecting wire W2 runs between the left and right side frames 20. The lower connecting wire W2 is disposed along a lower region of the back surface of the pressure-receiving member 40 and held by engagement of engageable claws (not shown) formed at the lower region of the rear surface of the pressure-receiving member 40 with the lower connecting wire W2, to thereby establish connection between the lower region of the pressure-receiving member 40 and the left and right side frames 20.

The posture control mechanism 50, which is a mechanism for causing the pressure-receiving member 40 to move, is provided on each of the left and right side frames 20, and thus disposed at the left and right sides of the pressure-receiving member 40. Although a detailed description will be given later, the posture control mechanism 50 is configured to cause the left end portion or the right end portion of the pressure-receiving member 40 to move from an initial position shown in FIG. 12(a) frontward to an advanced position shown in FIG. 12(c) to thereby cause the pressure-receiving member 40 to orient to the right or to the left, or to move (reverse) from the advanced position to the initial position.

Figure 10:
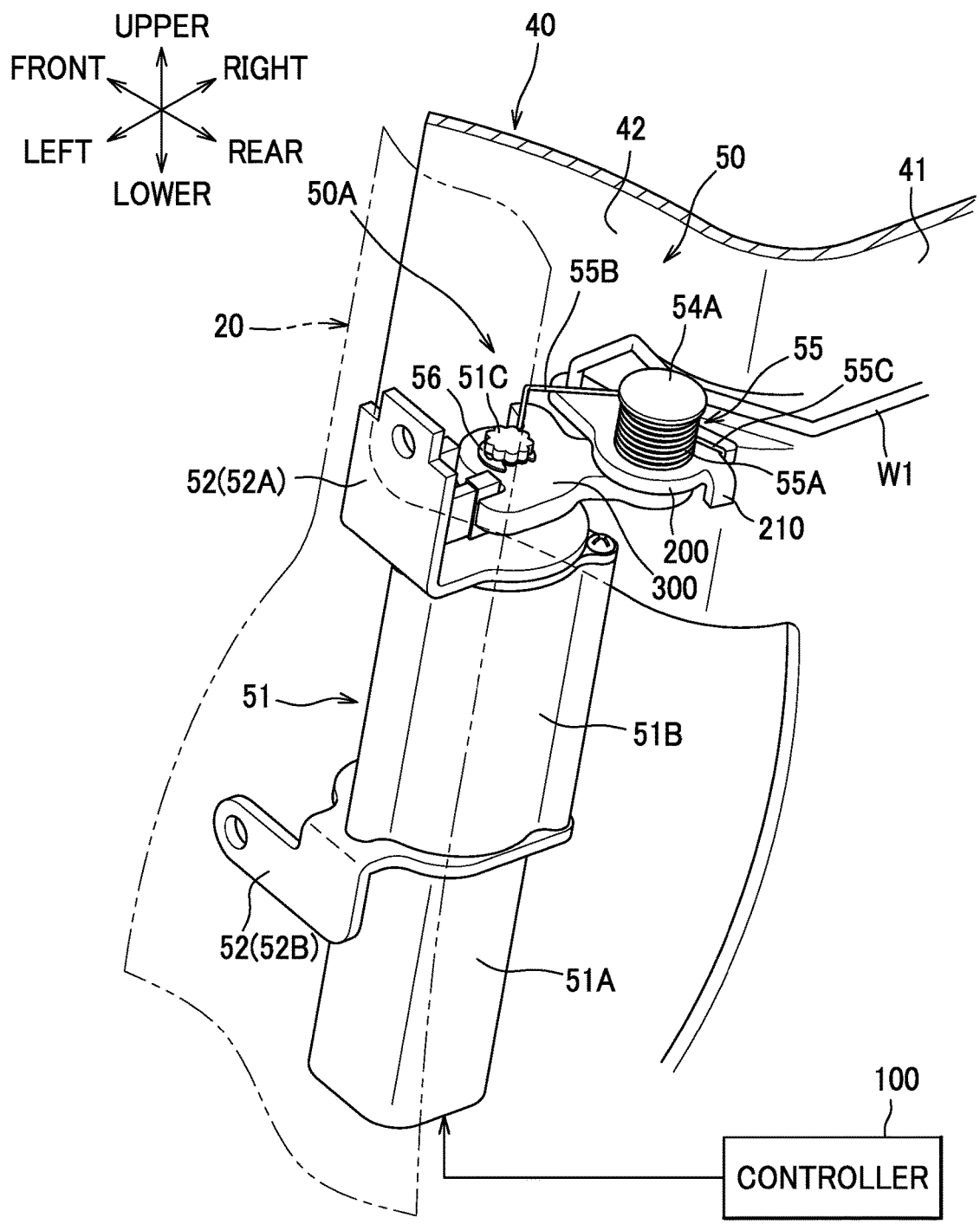
FIG. 10 is a perspective view of a posture control mechanism according to a second embodiment, as viewed from a rear side thereof.

As shown in FIG. 10, the posture control mechanism 50 is configured to mainly include a linkage 50A connected via the upper connecting wire W1 to the pressure-receiving member 40, and an actuator 51 (source of driving power) for actuating the linkage 50A. As the upper connecting wire W1 and the left and right posture control mechanisms 50 are constructed substantially in a laterally symmetric configuration, the following description will be elaborated mainly with reference to the illustration of the configuration of the left-side mechanisms.

The actuator 51 mainly includes a stepping motor 51A (motor) configured to be capable of rotating in the normal direction and in the reverse direction, a gear box 51B including a train of gears (not shown) for reducing the speed with which the driving power from the stepping motor 51A is transmitted, and an output shaft 51C to which the driving power from the stepping motor 51A is transmitted with the reduced speed. The actuator 51 is fixed to the side frame 20 via a retaining bracket 52 (52A, 52B).

Figure 11:
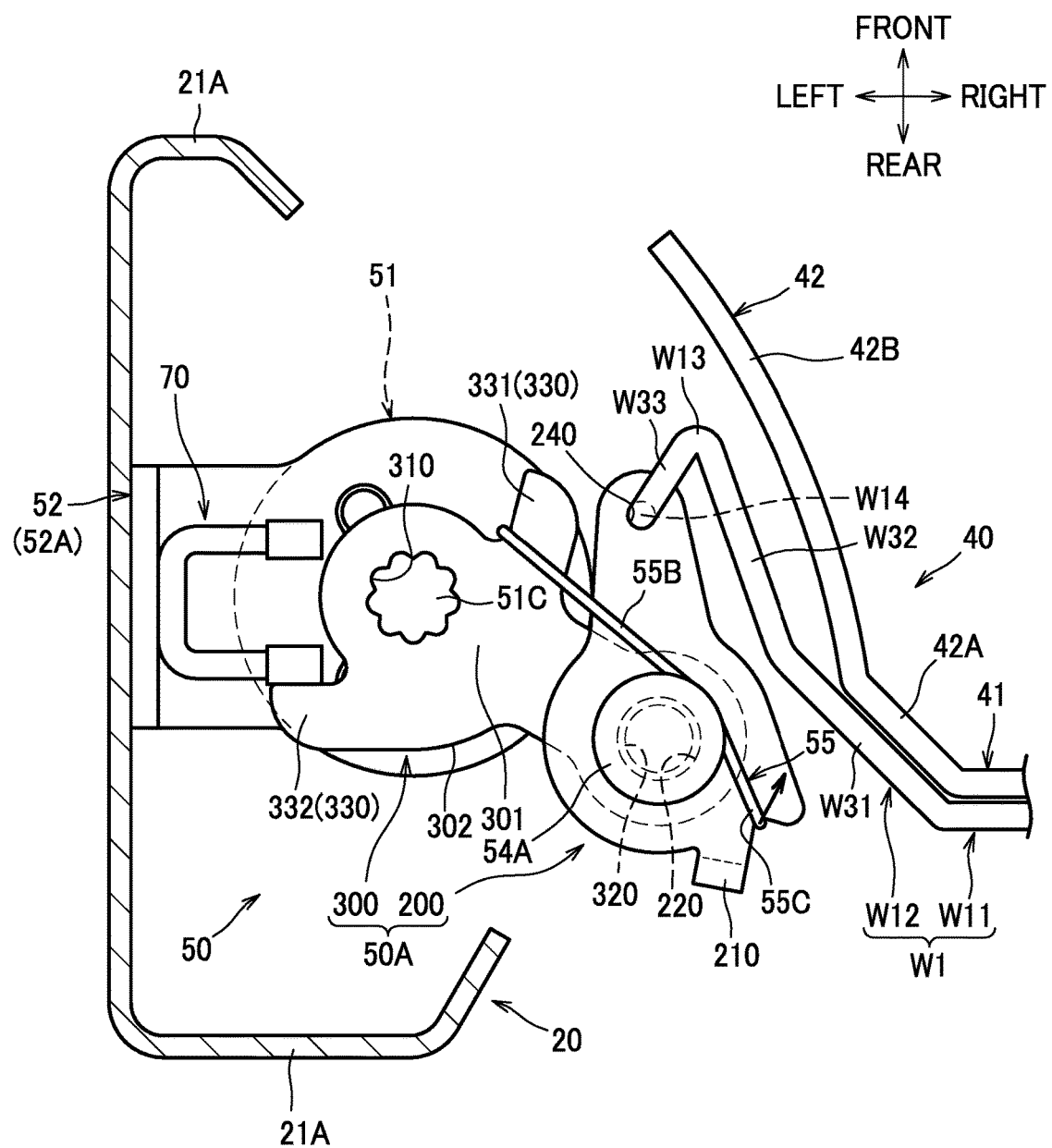
FIG. 11 is a plan view of the posture control mechanism according to the second embodiment.

As shown in FIG. 11, the linkage 50A is provided pivotally relative to the side frame 20, and mainly includes two links for causing the pressure-receiving member 40 to move, specifically: a first link member 300, and a second link member 200 (as a link member). The second link member 200 is configured as a plate member made of stamped or otherwise formed sheet metal.

The first link member 300 mainly has a shaft hole 310 provided at one end portion thereof, a pin hole 320 provided at another end portion, and stopper portions 330. The first link member 300 is connected to the output shaft 51C of the actuator 51 by serration fitting the shaft hole 310 on the output shaft 51C of the actuator 51, and retained by an e-style retaining ring 56 (see FIG. 10) so as not to disconnect from the output shaft 51C. Accordingly, the first link member 300 is configured to swing substantially in a frontward or rearward direction when the actuator 51 is driven to rotate the output shaft 51C. The stopper portions 330 are portions restricting a swinging motion of the first link member 300 itself when contacting a fixed stopper member 70 provided on the retaining bracket 52A. To be more specific, the stopper portions 330 include a first stopper portion 331 protruding from a position at or near a center of a main body portion 301 of the first link member 300 substantially in a frontward direction, and a second stopper portion 332 protruding from a position at or near the center of the main body portion 301 of the first link member 300 substantially in a leftward direction. The first link member 300 is restricted in its frontward swinging motion when the first stopper portion 331 comes in contact with the fixed stopper member 70, and is restricted in its rearward swinging motion when the second stopper portion 332 comes in contact with the fixed stopper member 70.

The second link member 200 mainly comprises a stopper 210 and a pin hole 220 provided at one end portion thereof, and a through hole 240 provided at another end portion thereof. The second link member 200 is provided in a manner swingable substantially in a frontward or rearward direction relative to the first link member 300 on a pin 54A engaged in its pin hole 220 and the pin hole 320 of the first link member 300. The stopper 210 is a portion restricting a rearward swinging motion of the second link member 200 when contacting a side surface 302 of the first link member 300 (see FIG. 12(c)). The stopper 210 which protrudes from the one end portion of the second link member 200 is bent at a farthest end of its protruded portion and extends therefrom to a lower side on which the first link member 300 is disposed (see also FIG. 10).

As shown in FIGS. 10 and 11, a torsion spring 55 is disposed in a mechanistically interjacent position between the first link member 300 and the second link member 200. The torsion spring 55 is a member which biases the second link member 200 toward a direction (indicated by arrow in FIG. 11) in which the second link member 200 is caused thereby to swing frontward, and includes a coiled portion 55A, a substantially L-shaped first arm portion 55B extending from an upper end of the coiled portion 55A radially outward and having a distal end portion thereof extending downward, and an L-shaped second arm portion 55C extending from a lower end of the coiled portion 55A radially outward and having a distal end portion thereof extending downward. The coiled portion 55A of the torsion spring 55 is engaged with the pin 54A, the first arm portion 55B that is one end of the torsion spring 55 is hooked on the first stopper portion 331 of the first link member 300, and the second arm portion 55C that is another end of the torsion spring 55 is hooked on the stopper 210 of the second link member 200.

As shown in FIG. 11, the support portion 42 of the pressure-receiving member 40 includes a first support portion 42A and a second support portion 42B. The first support portion 42A is a portion extending from an end of the pressure-receiving portion 41, and extends substantially straight in an obliquely laterally-outward-and-frontward direction from the end of the pressure-receiving portion 41 as viewed from above or from below. The second support portion 42B is a portion extending from a front end of the first support portion 42A, at which the support portion is bent, so that the second support portion 42B extends in a direction biased slightly frontward relative to a direction of extension of the first support portion 42A, and the second support portion 42B extends in an obliquely laterally-outward-and-frontward direction while being so curved as to bulge frontward as viewed from above or from below.

The upper connecting wire W1 includes a wire central portion W11 disposed along the back surface of the pressure-receiving portion 41, and a pair of left and right wire side portions W12 (only one illustrated) extending from the left and right ends of the wire central portion W11 in obliquely laterally-outward-and-frontward directions and disposed along the back surface of the support portions 42. The wire side portion W12 includes a first portion W31, a second portion W32, and a third portion W33; the upper connecting wire W1 includes bent portions W13 provided at left and right end portions, more specifically, each at a junction of the second portion W32 and the third portion W33. The first portion W31 is a portion extending from an end of the wire central portion W11, and extends in such a direction as to extend along the back surface of the first support portion 42A. The second portion W32 is a portion extending from a front end of the first portion W31, at which the wire side portion is bent, so that the second portion W32 extends in a direction biased slightly frontward relative to a direction of extension of the first portion W31, and the second portion W32 extends in an obliquely laterally-outward-and-frontward direction. The bent portion W13 is a portion shaped substantially like a letter V in plan view by bending, so as to extend from the second portion W32 in a direction away from the support portion 42, specifically, in an obliquely laterally-outward-and-rearward direction. The third portion W33 extends in an obliquely laterally-outward-and-rearward direction. A distal end portion of the third portion W33 is bent downward to have a substantially L-shaped configuration, to provide an end portion W14 engaged in the through hole 240 of the second link member 200. In this way, the upper connecting wire W1 is connected to the second link member 200, and connects the pressure-receiving member 40 engaged with the wire central portion W11 to the left and right second link members 200.

Figure 12:
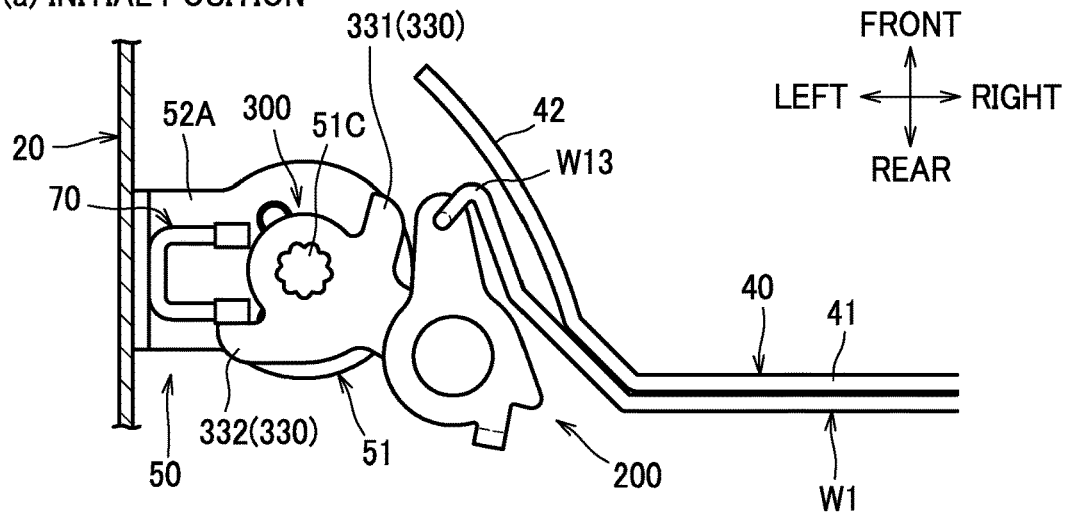
FIG. 12 includes schematic diagrams (a)-(c) for explaining operations of the posture control mechanism according to the second embodiment.
Figure 12:
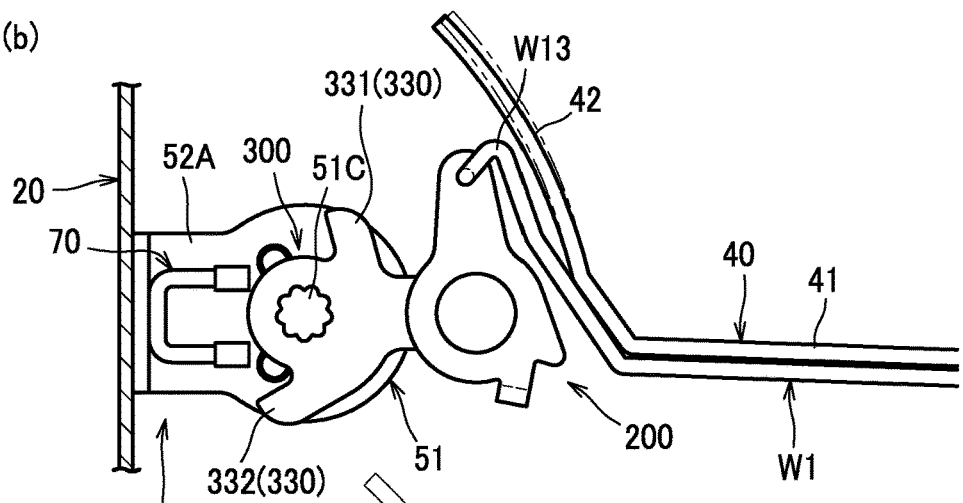
Figure 12:
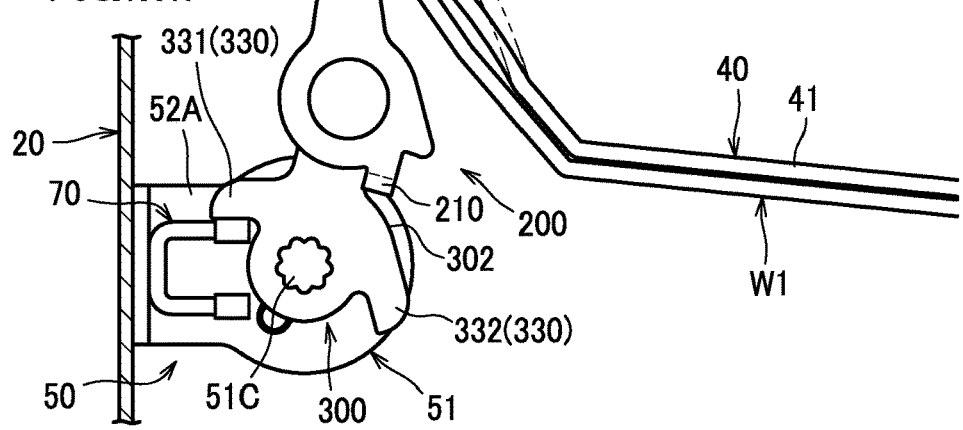

The bent portion W13 is located rearward of the support portion 42 while facing the back surface of the support portion 42. The bent portion W13 is located at a distance from the support portion 42 when no rearward load from an occupant is applied to the pressure-receiving member 40 or any load applied rearward from an occupant to the pressure-receiving member 40 is less than a predetermined magnitude. When a rearward load not less than the predetermined magnitude is applied from an occupant to the pressure-receiving member 40 and causes the support portion 42 to yield rearward, as shown in FIG. 12(c), the back surface of the support portion 42 comes in contact with the bent portion W13 from frontward. In other words, from the viewpoint of the bent portion W13, when a rearward load not less than the predetermined magnitude is applied from an occupant to the pressure-receiving member 40 and causes the support portion 42 to yield, the bent portion W13 comes in contact with the support portion 42 from rearward. It is to be understood that a load required for contact of the bent portion W13 and the support portion 42 can be adjusted by appropriately setting a gap made between the bent portion W13 and the support portion 42 when no load is applied to the pressure-receiving member 40 and/or flexibility of the pressure-receiving member 40 and/or the cushiony material of the seat back S2.

As shown in FIG. 11, the second link member 200 is located rearward of the support portion 42 while facing the back surface of the support portion 42. The second link member 200 is located in a position opposite to the support portion 42 such that the first member W31 and the second member W32 of the wire side portion W12 are sandwiched by the second link member 200 and the support portion 42 as viewed from above or from below; thus, the second link member 200 is so arranged as not to come in contact with the support portion 42.

The second portion W32 that is a part of the upper connecting wire W1 is disposed between the second link member 200 and the support portion 42 as viewed from above or from below (i.e., a direction of an axis of the swinging motion of the second link member 200). Also, the second portion W32 is disposed between the pin 54A (the axis of the swinging motion of the second link member 200) and the support portion 42 as viewed from above or from below.

Figure 13:
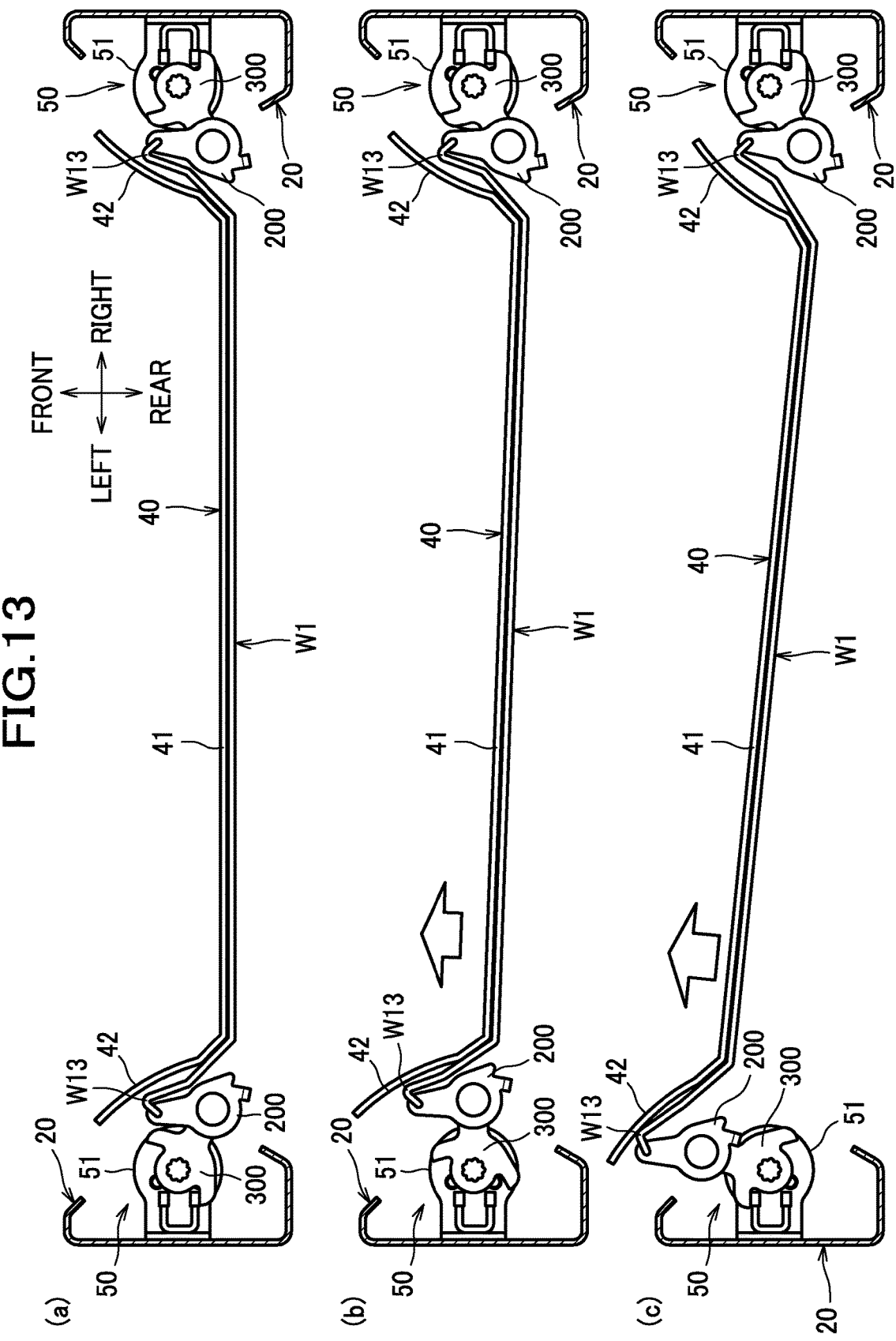
FIG. 13 includes schematic diagrams (a)-(c) for explaining operations of a car seat according to the second embodiment.

The left and right posture control mechanisms 50 are configured to be independently actuated by the actuator 51 under control of the controller 100 (see FIG. 10), to cause the pressure-receiving member 40 inside the seat back S2 to orient toward a turning direction (see FIG. 13(c)). Among feasible methods of control exercised by the controller 100 are methods of various types, which include, for example, a method comprising computing a lateral acceleration and a turning direction based upon signals from a wheel velocity sensor and a steering angle sensor, and when the thus-computed lateral acceleration has become greater than a predetermined threshold value, causing the actuator 51 (stepping motor 51A) of the posture control mechanism 50 located on a turning-direction outer side to be activated, thereby causing the pressure-receiving member 40 to orient toward the turning direction.

A description will be given of the motion of the car seat S during turning of the car.

When the car turns right, the controller 100 activates the actuator 51 of the left posture control mechanism 50. Thus, from the state shown in FIG. 12(a), the actuation proceeds as shown in FIGS. 12(b), (c); i.e., the first link member 300 swings frontward, and the second link member 200 moves frontward while swinging relative to the first link member 300. Accordingly, the left end portion of the upper connecting wire W1 moves frontward, and causes the left support portion 42 (left end portion) of the pressure-receiving member 40 to move from the initial position to the advanced position located in front thereof. As a result, as shown in FIGS. 13(a)-(c), the pressure-receiving member 40, as a whole, orients to the right that is the turning direction, so that the centrifugal force imposed on an occupant during the turning can adequately be supported by the seat back S2. When the left end portion of the pressure-receiving member 40 moves from the initial position toward the advanced position, the second link member 200 being actuated is kept out of contact with the pressure-receiving member 40. The bent portion W13 of the upper connecting wire W1 comes in contact with the support portion 42 from rearward as shown in FIGS. 12(a)-(c), as the centrifugal force applied to an occupant during turning produces a rearward load equal to or greater than a predetermined magnitude from the occupant which in turn causes the left support portion 42 to yield, thus deforming rearward. At this time, the bent portion W13 comes in contact from rearward with a portion of the pressure-receiving member 40 on or near the left edge thereof, to be more specific, with a laterally outer end portion of the left support portion 42 located in the advanced position.

When the car is getting shifted from the turning state toward the straight-traveling state, the controller 100 causes the actuator 51 of the left posture control mechanism 50 to be driven in a direction reverse to the direction in which it is driven at the time of turning. Thus, from the state shown in FIG. 12(c), the actuation proceeds as shown in FIGS. 12(b), (a); i.e., the first link member 300 swings rearward. Then, a load applied from an occupant to the pressure-receiving member 40 causes the second link member 200 to move rearward while swinging relative to the first link member 300. Accordingly, the left end portion of the upper connecting wire W1 moves rearward, and causes the left end portion of the pressure-receiving member 40 to move from the advanced position to the initial position. As a result, the pressure-receiving member 40 is shifted from the rightward-orienting state shown in FIG. 13(c) back to the frontward-orienting state shown in FIG. 13(a). When the left end portion of the pressure-receiving member 40 moves from the advanced position toward the initial position, as well, the second link member 200 being actuated is kept out of contact with the pressure-receiving member 40.

When the car turns left, the controller 100 activates the actuator 51 of the right posture control mechanism 50. Subsequent motions of the pressure-receiving member 40 and the right posture control mechanism 50 are similar to those imparted during the right turning; thus, a detailed description will be omitted.

According to the present embodiment as described above, the second link member 200 is kept out of contact with the support portion 42; therefore, wear of the second link member 200 and/or the pressure-receiving member 40 (in particular, pressure-receiving member 40 made of plastic) can be suppressed. Furthermore, as the second link member 200 is kept out of contact with the support portion 42, no direct load from the pressure-receiving member 40 is imposed on the second link member 200; therefore, the second link member 200 (posture control mechanism 50) can be operated adequately.

When a rearward load of a predetermined magnitude or greater applied from an occupant to the pressure-receiving member 40 causes the support portion 42 to become deformed, the bent portion W13 of the upper connecting wire W13 comes in contact with the support portion 42 from rearward; therefore, the support portion 42 of the pressure-receiving member 40 receiving the load from the occupant can be supported by the bent portion W13 (upper connecting wire W1). Accordingly, the stability of the occupant seated on the car seat S can be improved. Moreover, with the help of the springiness of the upper connecting wire W1, the load from the occupant can be received softly, so that improved ride comfort of the occupant and shock absorption can be achieved.

Furthermore, with consideration given to a large load imposed on the support portion 42 in the advanced position from the occupant by the centrifugal force applied to the occupant during turning, the bent portion W13 is so located as to be able to come in contact from rearward with the laterally outer end portion of the support portion 42 in the advanced position, as shown in FIG. 12(c); therefore, when the bent portion W13 comes in contact with the laterally outer end portion of the support portion 42, the laterally outer end portion of the support portion 42 (the portion on or near the laterally outer edge of the support portion 42) can be supported by the upper connecting wire W1. With this configuration, the stability of the occupant can be improved.

Third Embodiment

Hereafter, a third embodiment of the present invention will be described in detail with reference made to the drawings where appropriate.

Figure 14:
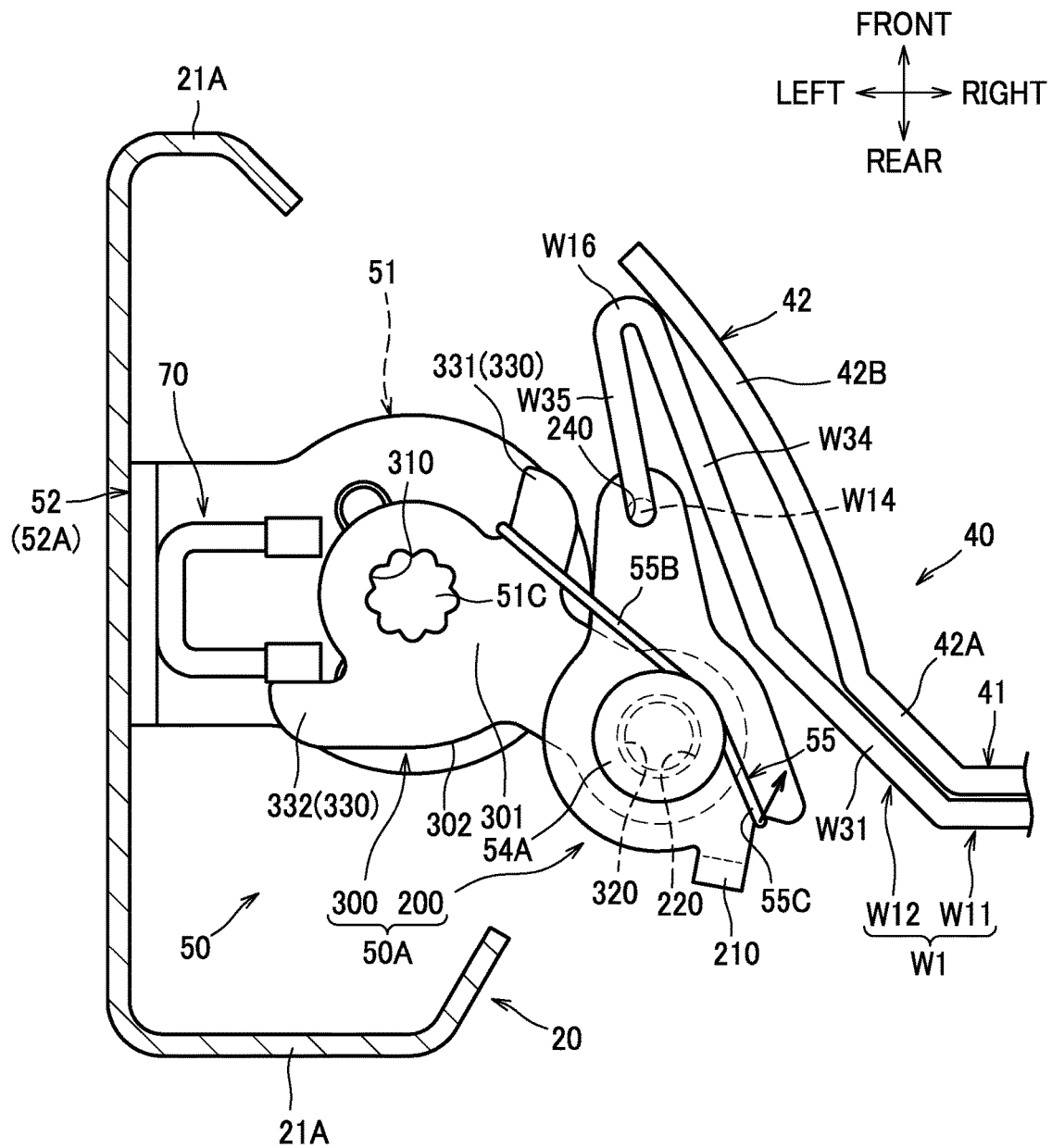
FIG. 14 is a plan view of a posture control mechanism according to a third embodiment.

As shown in FIG. 14, in the present embodiment, the upper connecting wire W1 includes a wire central portion W11 and a pair of left and right wire side portions W12 (only one illustrated). The wire side portion W12 includes a first portion W31, a second portion W34, and third portion W35; the upper connecting wire W1 includes bent portions W16 provided at left and right end portions, more specifically, each at a junction of the second portion W34 and the third portion W35. The second portion W34 extends from a front end of the first portion W31, at which the wire side portion is bent, so that the second portion W34 extends in a direction biased slightly frontward relative to a direction of extension of the first portion W31, and the second portion W34 further extends in an obliquely laterally-outward-and-frontward direction long up to a position close to the front end of the second support portion 42B. The bent portion W16 is a portion shaped substantially like a letter U in plan view by bending, so as to extend from the second portion W34 in a direction away from the support portion 42, specifically, in a substantially rearward direction. The third portion W35 extends in a substantially rearward direction, and includes a distal end portion W14 bent downward and engaged in the through hole 240 of the second link member 200.

The bent portion W16 is located rearward of the support portion 42 while facing the back surface of the support portion 42. In the present embodiment, the bent portion W16 is so disposed as to always be kept in contact with the support portion 42 from rearward during movement of the support portion 42 between the initial position and the advanced position, in other words, regardless of the position of the support portion 42. That is, the bent portion W16 is disposed in such a manner that the support portion 42, regardless of its position, can always be supported thereby from rearward.

The second link member 200 is located rearward of the support portion 42 while facing the back surface of the support portion 42. The second link member 200 is located in a position opposite to the support portion 42 such that the first member W31 and the second member W34 of the wire side portion W12 are sandwiched by the second link member 200 and the support portion 42 as viewed from above or from below; thus the second link member 200 is so arranged as not to come in contact with the support portion 42.

The second portion W34 that is a part of the upper connecting wire W1 is disposed between the second link member 200 and the support portion 42 as viewed from above or from below. Also, the second portion W34 is disposed between the pin 54A (the shaft on which the second link member 200 may swing) and the support portion 42 as viewed from above or from below.

A brief description will now be given of the motion of the car seat S during turning of the car according to the present embodiment, taking the right-turn situation as an example.

Figure 15:
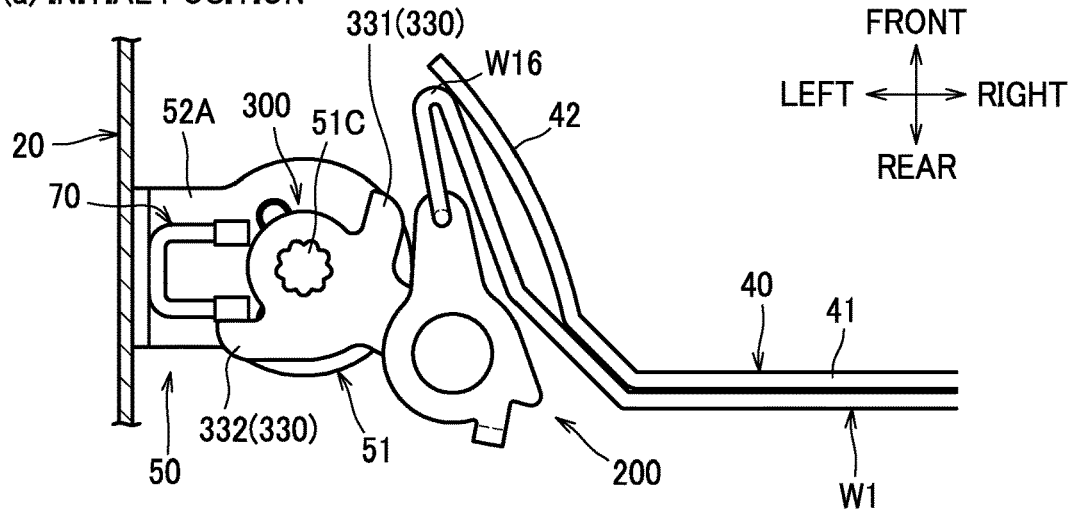
FIG. 15 includes schematic diagrams (a)-(c) for explaining operations of the posture control mechanism according to the third embodiment.
Figure 15:
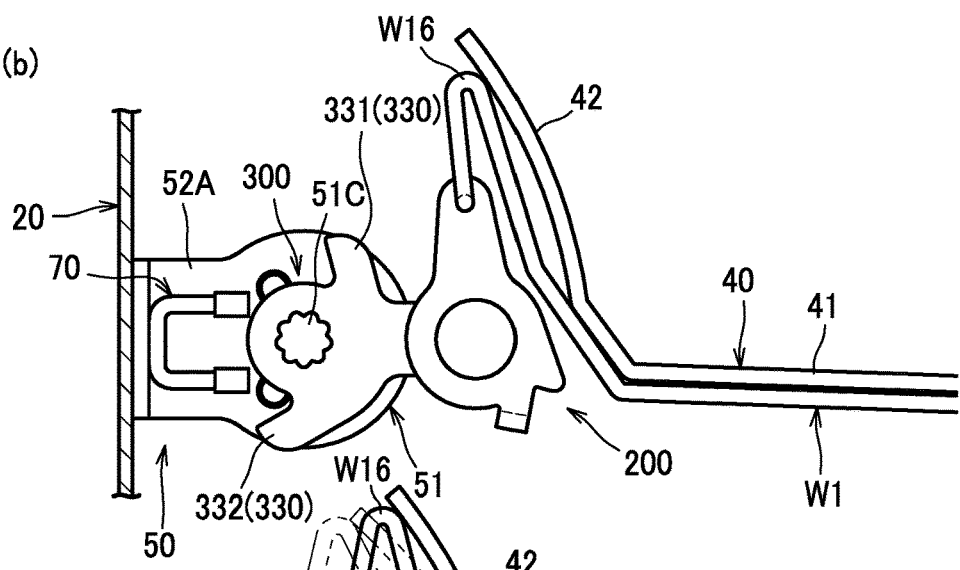
Figure 15:
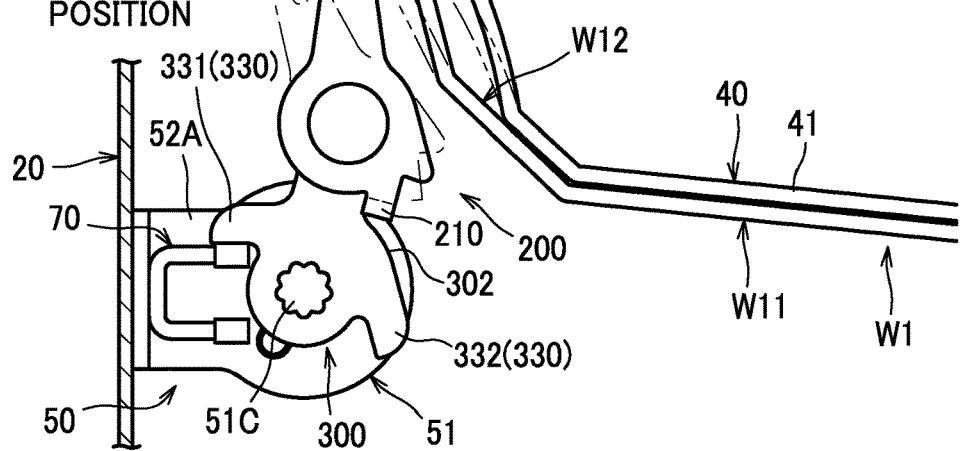

When the car turns right, the actuator 51 of the left posture control mechanism 50 is activated. Thus, from the state shown in FIG. 15(a), the actuation proceeds as shown in FIGS. 15(b), (c); i.e., the first link member 300 swings frontward, and the second link member 200 moves frontward while swinging relative to the first link member 300. Accordingly, the left end portion of the upper connecting wire W1 moves frontward, and causes the left support portion 42 (left end portion) of the pressure-receiving member 40 to move from the initial position to the advanced position located in front thereof. In this process, the second link member 200 is actuated while being kept out of contact with the pressure-receiving member 40. Furthermore, as shown in FIG. 15(c), the bent portion W16 of the upper connecting wire W1 comes in contact with the laterally outer end portion of the left support portion 42 in the advanced position from rearward. If a greater load is imposed on the support portion 42, then the wire side portion W12 of the upper connecting wire W1 undergoes elastic deformation to get outstretched laterally outward, and the second link member 200 thus pushed by the upper connecting wire W1 swings counterclockwise as seen in the drawing, so that the bent portion W16 deforms and opens out; however, that load can be received in a shock-absorbing manner by using the elasticity of the bent portion W16.

When the car is getting shifted from the turning state back toward the straight-traveling state, the actuator 51 of the left posture control mechanism 50 is driven in a direction reverse to the direction in which it is driven at the time of turning. Thus, from the state shown in FIG. 15(c), the actuation proceeds as shown in FIGS. 15(b), (a); i.e., the first link member 300 swings rearward. Then, a load applied from an occupant to the pressure-receiving member 40 causes the second link member 200 to move rearward while swinging relative to the first link member 300. Accordingly, the left end portion of the upper connecting wire W1 moves rearward, and causes the left end portion of the pressure-receiving member 40 to move from the advanced position to the initial position. In this process as well, the second link member 200 is actuated while being kept out of contact with the pressure-receiving member 40.

According to the present embodiment as described above, as in the second embodiment, the second link member 200 is kept out of contact with the support portion 42; therefore, wear of the pressure-receiving member 40 or the like can be suppressed. Furthermore, as no direct load from the pressure-receiving member 40 is imposed on the second link member 200, the second link member 200 can be operated adequately.

Moreover, since the bent portion W16 comes in contact with the laterally outer end portion of the support portion 42 located in the advanced position from rearward, the portion of the support portion 42 on or near the laterally outer edge thereof can be supported by the upper connecting wire W1, so that the stability of the occupant can be improved.

Furthermore, according to the present embodiment in which the bent portion W16 of the upper connecting wire W1 is always in contact with the support portion 42 from rearward, the support portion 42 of the pressure-receiving member 40 which receives a load from the occupant can be supported constantly by the upper connecting wire W1. Accordingly, the stability of the occupant can be improved. Furthermore, since the load from the occupant can be received softly by making use of the springiness of the upper connecting wire W1, the improved ride comfort and shock absorption can be achieved.

Fourth Embodiment

Hereafter, a fourth embodiment of the present invention will be described in detail with reference made to the drawings where appropriate. In describing the present embodiment, "laterally inner side (laterally inward)" and "laterally outer side (laterally outward)" are intended to refer to the laterally inner side (inward) and outer side (outward) with respect to the vehicle seat, unless otherwise specified.

A vehicle seat to be installed in an automobile or the like comprises left and right side frames. For example, a seat apparatus disclosed in JP 2013-49356 A is configured such that a frame of the seat back includes a pair of left and right side frames extending in upward-downward direction. The seat apparatus disclosed in JP 2013-49356 A further comprises a back plate disposed between the left and right side frames and a rocking mechanism configured to rock the back plate, wherein the orientation of the back plate can be changed to the left or to the right through actuation of the rocking mechanism.

In recent years, vehicle seats are provided with many devices such as the aforementioned rocking mechanism, and therefore, effective use of available spaces stands in need.

With this in view, it is an object of the present embodiment to provide a vehicle seat in which effective use of available spaces can be achieved.

It is another object to protect a device(s) provided in a vehicle seat.

It is still another object to provide a simplified structure for mounting a device(s).

It is still another object to check increase in size of a vehicle seat and to provide greater rigidity in side frames.

It is still another object to make devices properly operable.

Figure 16:
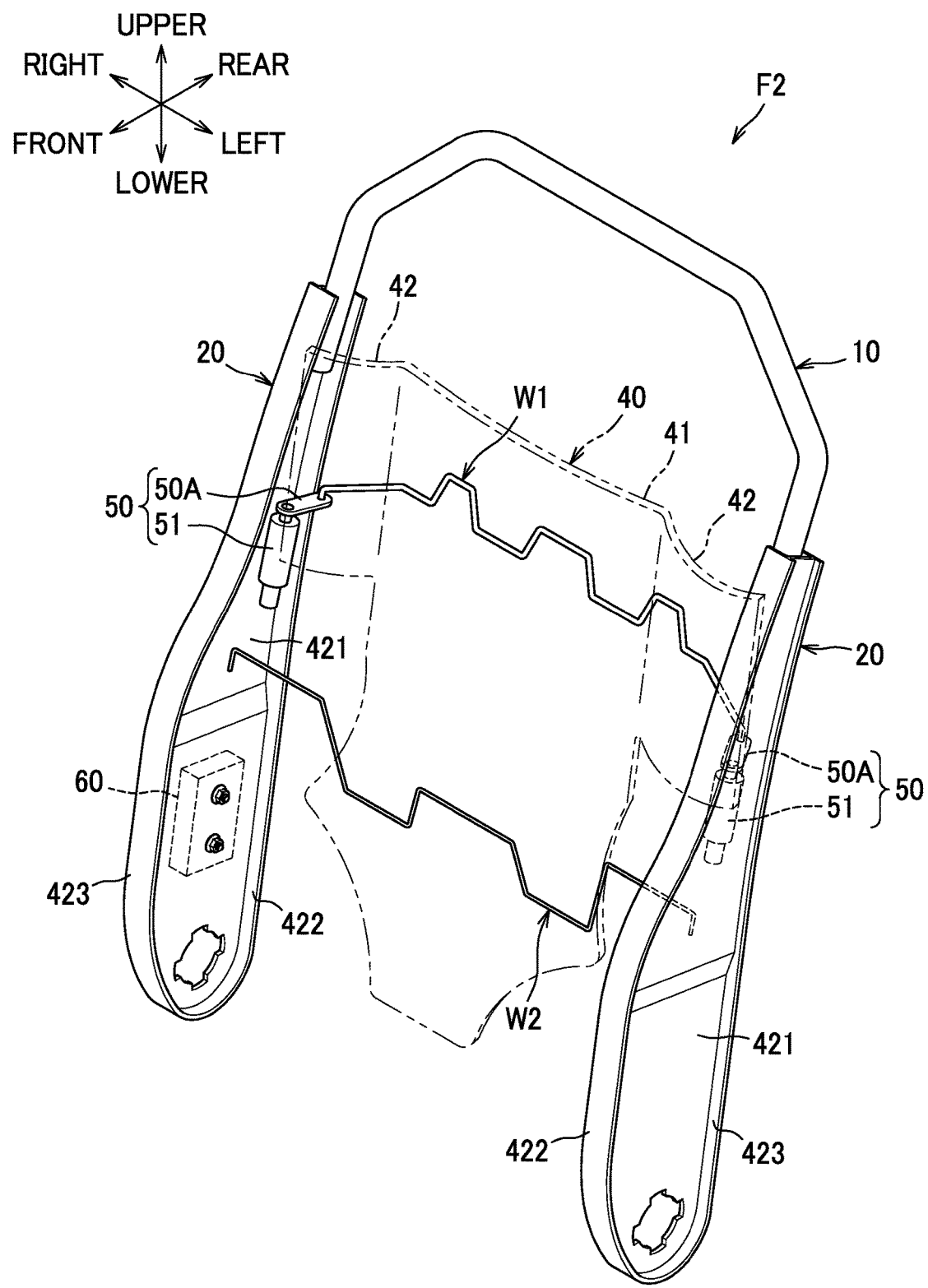
FIG. 16 is a perspective view of a seat back frame incorporated in a car seat according to a fourth embodiment.

In the present embodiment, a seat back S2 incorporates a seat back frame F2 as shown in FIG. 16.

The seat back frame F2 mainly includes an upper frame 10, and left and right side frames 20 that constitute left and right frames of the seat back S2. The upper frame 10 is formed of a metal pipe material bent in a substantially U-shaped configuration, and has lower portions thereof welded or otherwise joined integrally to upper portions of the left and right side frames 20. A detailed description of the side frames 20 will be given later.

A pressure-receiving member 40 as a movable part of the seat back S2 (of a car seat S) and a pair of left and right posture control mechanisms 50 (actuator mechanisms) are disposed between the left and right side frames 20. An airbag device 60 as a second device is provided on the right side frame 20 that is disposed at a laterally outer side of the car.

The pressure-receiving member 40 is a plate member configured to receive a load from an occupant seated on the car seat S through an outer covering and a cushiony material, and is formed of plastic or the like with elastically deformable property. The pressure-receiving member 40 is configured to include a pressure-receiving portion 41 and left and right support portions 42 formed integrally in one piece, of which the pressure-receiving portion 41 is disposed to face the back of the occupant, and the support portions 42 protrudes from upper portions of left and right ends of the pressure-receiving portion 41 in obliquely-laterally-outward-and-frontward directions.

The pressure-receiving member 40 is connected to the left and right side frames 20 through an upper connecting wire W1 and a lower connecting wire W2 in such a manner that the pressure-receiving member 40 is movable frontward and rearward relative to the left and right side frames 20. The upper connecting wire W1 has two end portions connected to the posture control mechanisms 50 fixed to the side frames 20, respectively, and configured to connect the upper portion of the pressure-receiving member 40 to the left and right side frames 20 by engagement of engageable claws (not shown) formed at the upper region of the rear surface of the pressure-receiving member 40 with the upper connecting wire W1. The lower connecting wire W2 has its both end portions connected to wire mount portions (not shown) provided on the side frames 20, respectively, and configured to connect the lower portion of the pressure-receiving member 40 to the left and right side frames 20 by engagement of engageable claws (not shown) formed at the lower region of the rear surface of the pressure-receiving member 40 with the lower connecting wire W2.

The posture control mechanism 50, which is a mechanism for causing the pressure-receiving member 40 to move, is provided on each of the left and right side frames 20, and thus disposed at the left and right sides of the pressure-receiving member 40. The posture control mechanism 50 is configured: to cause the left end portion or the right end portion of the pressure-receiving member 40 to move from an initial position (see FIG. 4) to an advanced position (see FIG. 5(*b*)) to thereby cause the pressure-receiving member 40 to orient to the right or to the left; or to move (reverse) from the advanced position to the initial position. To this end, the posture control mechanism 50 mainly includes a linkage 50A (first link member 53 and second link member 54) connected via the upper connecting wire W1 to the pressure-receiving member 40, and an actuator 51 as a first device configured to actuate the linkage 50A to cause the pressure-receiving member 40 to move.

Figure 17:
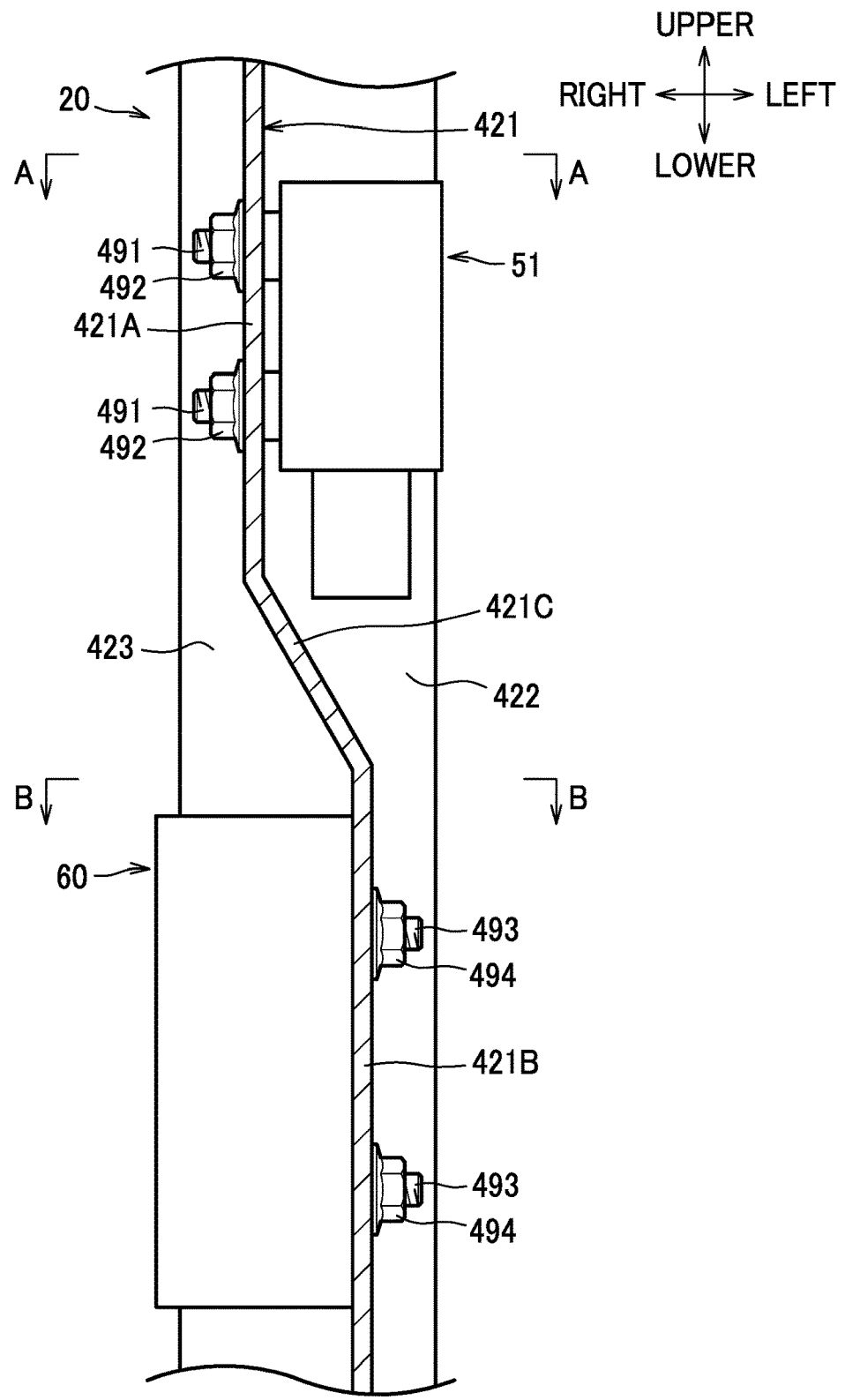
FIG. 17 is a sectional view taken along a plane extending through a right side frame in a direction perpendicular to the front-rear direction.

The actuator 51 is attached to a laterally inner side of the side frame 20 (side portion 421) via a retaining bracket (not shown) by tightening bolts 491 and nuts 492 (see FIG. 17).

The airbag device 60 is configured to include a bag (not shown) and an inflator or other components. The airbag device 60 may be of a known configuration, and thus a detailed description thereof is omitted herein. The airbag device 60 is attached to a laterally outer side of the right side frame 20 (side portion 421) by tightening bolts 493 and nuts 494 (see FIG. 17).

Figure 18:
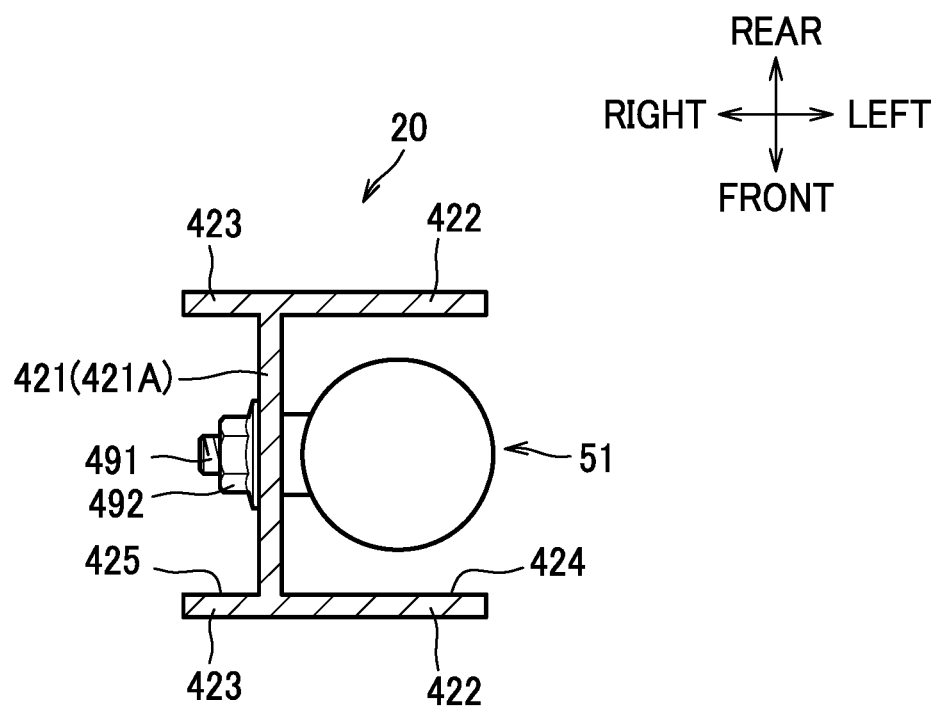
FIG. 18 includes a sectional view (a) taken along line A-A of FIG. 17 and a sectional view (b) taken along line B-B of FIG. 17.
Figure 18:
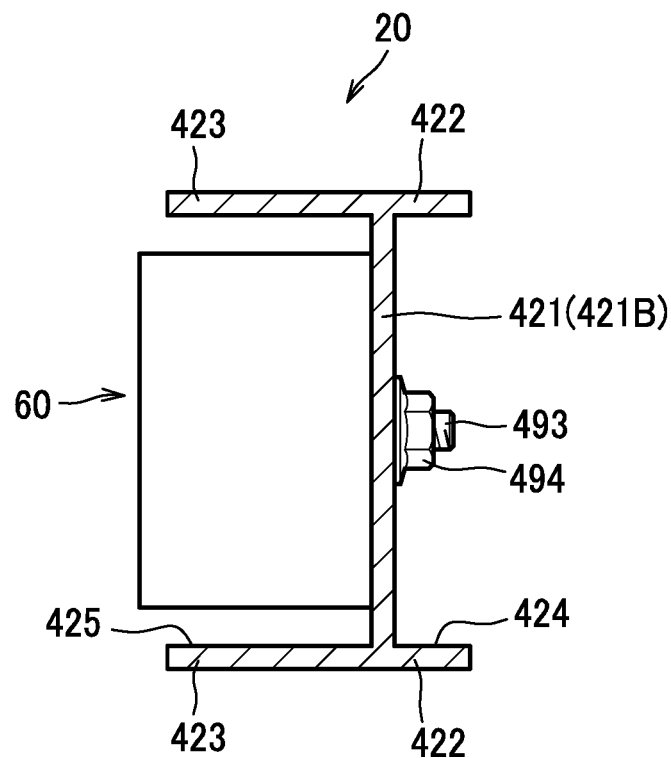

Each of the left and right side frames 20, which includes a side portion 421, a pair of front and rear inner extension portions 422, and a pair of front and rear outer extension portions 423, is formed to have a shape of a seriffed letter I (or a letter H without serifs) in cross section (see also FIG. 18). In the present embodiment, as the left and right side frames 20 are provided with a configuration laterally symmetric to each other, the following description will be elaborated mainly with reference to the illustration of the configuration at the right side frame.

As shown in FIG. 17, the side portion 421 is a portion to which the actuator 51 and the airbag device 60 are attached, and has a shape of a plate elongated in an upward-downward direction. The side portion 421 includes an upper side portion 421A as a first portion, a lower side portion 421B as a second portion that is formed below the upper side portion 421A, and a connecting portion 421C. The actuator 51 is attached to the laterally inner side of the upper side portion 421A, and the airbag device 60 is attached to the laterally outer side of the lower side portion 421B. Accordingly, the actuator 51 and the airbag device 60 are disposed in positions shifted from each other in the upward-downward direction. The lower side portion 421B is disposed in a position shifted from the upper side portion 421A in the laterally inner direction, and the connecting portion 421C extends from a lower end of the upper side portion 421A to an upper end of the lower side portion 421B which is positioned below the lower end of the upper side portion 421A off to the laterally inner side, such that the connecting portion 421C connects the lower end of the upper side portion 421A and the upper end of the lower side portion 421B. With this configuration, the actuator 51 and the airbag device 60 are located to overlap each other partly when viewed from above or from below, to be more specific, a laterally outer end portion of the actuator 51 and a laterally inner end portion of the airbag device 60 overlap each other.

As shown in FIGS. 18(*a*), (*b*), the inner extension portions 422 are portions extending from the respective front and rear ends (edges) of the side portion 421 laterally inward. The actuator 51 is disposed in a recess 424 formed by the side portion 421 and the front and rear inner extension portions 422.

The outer extension portions 423 are portions extending from the respective front and rear ends (edges) of the side portion 421 laterally outward. The airbag device 60 is disposed in a recess 425 formed by the side portion 421 and the front and rear outer extension portions 423.

The side frame 20 as described above may be formed, as an example, of two metal sheets welded or otherwise joined together in one piece. To be more specific, one metal sheet to constitute the side portion 421 is bent to form the upper side portion 421A, the connecting portion 421C and the lower side portion 421B. Thereafter, another elongate metal sheet to constitute the extension portions 422, 423 is disposed to wrap around the edge of the one metal sheet (side portion 421) and welded or otherwise joined thereto in one piece. In this way, the side frame 20 can be formed.

According to the present embodiment as described above, in which the actuator 51 is disposed in the recess 424 formed by the side portion 421 and the inner extension portions 422 of the side frame 20, the space in the seat back S2 can be utilized effectively. Moreover, the actuator 51 can be protected by the inner extension portions 422 disposed in front and in the rear of the actuator 51.

Furthermore, since the airbag device 60 is disposed in the recess 425 formed by the side portion 421 and the outer extension portions 423, the space in the seat back S2 can be utilized more effectively. Moreover, the airbag device 60 can be protected by the outer extension portions 423 disposed in front and in the rear of the airbag device 60.

Furthermore, since the actuator 51 and the airbag device 60 are located in positions shifted from each other in the upward-downward direction, the bolts/nuts 491/492 and the bolts/nuts 493/494 are rendered unlikely to interfere with each other. Moreover, the bolts/nuts 491/492 and the airbag device 60 are rendered unlikely to interfere with each other, whereas the bolts/nuts 493/494 and the actuator 51 are rendered unlikely to interfere with each other. Moreover, the actuator 51 and the airbag device 60 can be attached easily at laterally opposite sides by tightening the bolts 491, 493 and the nuts 492, 494. In other words, since the actuator 51 and the airbag device 60 are located in positions shifted from each other in the upward-downward direction, the structures for mounting the actuator 51 and the airbag device 60 can be embodied in a simple structure.

Furthermore, since the lower side portion 421B to which the airbag device 60 is attached is in a position shifted laterally inward from that of the upper side portion 421A to which the actuator 51 is attached, available space can be utilized effectively and the increase in size (particularly lateral dimension) of the car seat S as would result from arrangement of the airbag device 60 at the laterally outer side of the side frame 20 can be checked. Moreover, as compared with an alternative configuration in which the side portion is an unbent, flat plate, greater rigidity can be provided in the side frame 20. To be more specific, since the side portion 421 includes an upper side portion 421A, a lower portion 421B located in a position shifted from that of the upper side portion 421A, and a connecting portion 421C connecting the upper side portion 421A and the lower side portion 421B, which are provided integrally in one piece, the increase in the rigidity of the side portion 421 in itself may be increased, and in particular the extension portions 422, 423 provided at the edge of the side portion 421 can be enhanced in rigidity. In addition, the extension portions 422, 423 (metal sheets of which the extension portions 422, 423 are made) can be enhanced in structure against torsion.

Furthermore, since the airbag device 60 as the second device is disposed at a laterally outer side of the side frame 20, the bag (not shown) of the airbag device 60 can be supported by the side portion 421 when the bag inflates, so that the bag can be deployed properly. In other words, provision of the airbag device 60 as the second device at the laterally outer side of the side frame 20 helps proper actuation of the airbag device 60.

Although some embodiments of the present invention have been described above, the present invention is not limited to the above-described embodiments. Specific configurations may be modified where appropriate without departing the gist of the present invention as will be described below.

In the first embodiment, the lateral acceleration acquisition unit 110 is configured to acquire a lateral acceleration GC by computation based on the wheel velocity and the steering angle, but this is not an essential limitation. For example, the lateral acceleration acquisition unit may be configured to acquire a lateral acceleration from a lateral acceleration sensor. Alternatively, if an electronic control unit equipped in the car is capable of providing a lateral acceleration, the lateral acceleration acquisition unit may be configured to interrogate the electronic control unit and acquire the lateral acceleration.

In the first embodiment, the posture control unit 130 is configured such that when a magnitude of the lateral acceleration GC has become equal to or greater than the first threshold value GCth1, a seat posture control is started under which the pressure-receiving member 40 is moved from the initial position to the advanced position; however, the condition(s) on which the seat posture control is activated is not limited to the condition as prescribed in the first embodiment. Neither is the condition(s) on which the seat posture control is brought to an end. For example, the posture control unit may alternatively be configured to execute the seat posture control based on combination of the steering angle and the vehicle speed without computing the lateral acceleration.

In the first embodiment, the intermediate position as the second position is between the initial position and the advanced position (first position), but is not limited to this position; for example, the second position may be the same position as the initial position. The second position may comprise a plurality of positions between the initial position and the first position. In other words, the posture control unit may be configured to reversely change the orientation of the seat back stepwise in accordance with a lapse of the execution time of the seat posture control. For example, in the case where the first intermediate position and the second intermediate position are arranged in this sequence from the front between the initial position and the advanced position, the posture control unit may be configured such that the pressure-receiving member is moved from the advanced position to the first intermediate position when the execution time of the seat posture control has become equal to or greater than a first execution time threshold value, and further moved from the first intermediate position to the second intermediate position when the execution time of the seat posture control has become equal to or greater than a second execution time threshold value that is a time longer than the first execution time threshold value. Also in the case where three or more intermediate positions are arranged, the control proceeds in a similar manner.

In the above-described embodiments, the posture control mechanism 50 (actuator 51) is configured to be capable of changing the orientation of the seat back S2 (the orientation of the support surface S23) laterally by moving the pressure-receiving member 40 as part of the seat back S2, but this is not an essential limitation. For example, the actuator may be configured to be capable of changing the orientation of the seat back (the orientation of the side portions) laterally by moving the left and right side portions of the seat back (see S22 in FIG. 1) as part of the seat back. Also, the actuator may be configured to be capable of changing the orientation of the whole seat back laterally by moving the whole seat back. Moreover, the actuator may be capable of changing the orientation of the whole car seat laterally by moving the whole car seat.

In the above-described embodiments, the pressure-receiving member 40 includes the support portions 42 provided to protrude from the upper portions of the left and right ends of the pressure-receiving portion 41, but this is not an essential limitation. For example, the support portions may be provided to protrude from vertically central portions of the left and right ends of the pressure-receiving portion, or may be provided to protrude from the whole lengths of the left and right ends of the pressure-receiving portion.

In the second embodiment, the linkage 50A is of two-link configuration which includes the second link member 200 as a link member, but this is not an essential limitation. For example, the linkage may be configured to only include the link member (i.e., a single-link configuration), or may be configured to comprise three or more links that include the link member.

In the second embodiment, the upper connecting wire W1 (connecting wire) is arranged such that at least when a rearward load not less than the predetermined magnitude is applied from an occupant to the pressure-receiving member 40, the bent portion W13 comes in contact with the support portion 42; however, this is not an essential limitation. For example, the bent portion of the connecting wire may be so arranged as not to come in contact with the support portion.

In the fourth embodiment, the side portion 421 of the side frame 20 includes an upper side portion 421A as a first portion and a lower side portion 421B as a second portion, but this configuration is not an essential limitation. For example, the second portion may be formed above the first portion. Alternatively, the first portion and the second portion may be provided as those arranged in the front-rear direction as viewed from the left or right direction. Also, the side portions of the side frame may be formed as a flat plate without being bent.

In the fourth embodiment, as shown in FIG. 17, the actuator 51 as the first device and the airbag device 60 as the second device are arranged in positions shifted from each other in the upward-downward direction, but this is not an essential limitation. For example, the actuator and the airbag device may be arranged at the same height so as to overlap as viewed from the left or right direction. With this configuration, additional devices or parts other than the actuator and the airbag device can be attached to the side frame; therefore, the available space can be utilized more effectively.

In the fourth embodiment, the side frame 20 so formed in one piece of one metal plate welded or otherwise joined integrally to edges of another metal plate as to have a shape of a seriffed letter I (or a letter H without serifs) in cross section is illustrated by way of example, but this is not an essential limitation. For example, the side frame, if designed to have a constant cross sectional shape, may be formed by extrusion of metal material. Alternatively, the side frame may be so formed as to have a shape of a seriffed letter I in cross section with a side portion, inner extension portions and outer extension portions, by bending one metal sheet.

In the fourth embodiment, the front and rear inner extension portions 422 are configured to have the same lateral length, but this is not an essential limitation; for example, the front and rear inner extension portions may have lateral lengths different from each other. The same applies to the outer extension portions. Similarly, the inner extension portion and the outer extension portion aligned laterally may have the same lateral length.

In the fourth embodiment, the inner extension portions 422 and the outer extension portions 423 are all shaped to extend laterally straight, but this shape is not an essential limitation. For example, the inner extension portions and the outer extension portions may have distal end portions bent inward or outward in the front-rear direction. Alternatively, the inner extension portions and the outer extension portions may have distal end portions curved inward or outward in the front-rear direction.

In the fourth embodiment, each of the left and right side frames 20 is so formed as to have a shape of a seriffed letter I in cross section with a side portion 421, inner extension portions 422 and outer extension portions 423, but this is not an essential limitation. For example, the first device and/or the second device may be attached to only one of the left and right side frames, and in this configuration, that only one of the left and right side frames may be so formed as to have a shape of a seriffed letter I in cross section with a side portion, inner extension portions and outer extension portions.

In the fourth embodiment, illustrated as an example of the first device is the actuator 51 configured to move the movable portion (pressure-receiving member 40) of the seat back S2, while illustrated as an example of the second device is the airbag device 60; however, this configuration is not an essential limitation. For example, the first device may be an actuator configured to move a movable portion of the seat cushion. The car seat may be configured such that both of the first device and the second device are attached to the left and right side frames, respectively. The car seat may be configured such that the first device is attached to only one of the left and right side frames. The car seat may be configured to only include the first device but not include the second device.

In the fourth embodiment, the left and right side frames 20 that constitute the left and right frames of the seat back S2 are illustrated as an example of the left and right side frames, but this is not an essential limitation. For example, the side frames may be side frames of a frame that constitutes left and right frames of the seat cushion. The side frames may be configured to have an integral structure formed of the frame of the seat back and the frame of the seat cushion.

In the above-described embodiments, the car seat S for use in an automobile is illustrated as an example of the vehicle seat, but this is not an essential limitation; rather, the vehicle seat may include any other vehicle seats for use, for example, in snowmobiles, railcars, ships, aircrafts, and so forth.

The invention claimed is:

1. A vehicle seat, comprising:
   a seat cushion;
   a seat back;
   an actuator capable of changing an orientation of the seat back laterally by moving at least part of the seat back; and
   a controller configured to exercise control over the actuator,
   wherein the controller includes a posture control unit configured to execute, during turning of a vehicle, a seat posture control under which the actuator is caused to move the at least part of the seat back from an initial position to a first position to cause the seat back to orient toward a turning direction,
   wherein the posture control unit is configured to activate, when an execution time of the seat posture control has become equal to or greater than an execution time threshold value, a control under which the actuator is caused to move the at least part of the seat back from the first position to a second position to reversely change the orientation of the seat back, and
   wherein the posture control unit is configured such that a motion from the first position to the second position is produced with a speed slower than a speed of a motion from the initial position to the first position as produced during startup of the seat posture control.

2. The vehicle seat according to claim 1, wherein the controller includes a lateral acceleration acquisition unit configured to acquire a lateral acceleration, and
   wherein the posture control unit is configured to activate, when a magnitude of the lateral acceleration acquired by the lateral acceleration acquisition unit during the turning of the vehicle has become equal to or greater than a first threshold value, a control under which the actuator is caused to move the at least part of the seat back from the initial position to the first position.

3. The vehicle seat according to claim 2, wherein the posture control unit is configured to activate, when a magnitude of the lateral acceleration acquired by the lateral acceleration acquisition unit during the seat posture control has become equal to or smaller than a second threshold value that is smaller than the first threshold value, a control under which the actuator is caused to move the at least part of the seat back to the initial position to thereby bring the seat posture control to an end.

4. The vehicle seat according to claim 1, wherein the second position is between the initial position and the first position.

5. A vehicle seat, comprising:
   a seat cushion;
   a seat back;
   an actuator capable of changing an orientation of the seat back laterally by moving at least part of the seat back; and
   a controller configured to exercise control over the actuator,
   wherein the controller includes a posture control unit configured to execute, during turning of a vehicle, a seat posture control under which the actuator is caused to move the at least part of the seat back from an initial position to a first position to cause the seat back to orient toward a turning direction,
   wherein the posture control unit is configured to activate, when an execution time of the seat posture control has become equal to or greater than an execution time threshold value, a control under which the actuator is caused to move the at least part of the seat back from the first position to a second position to reversely change the orientation of the seat back, and
   wherein the posture control unit is configured such that a motion from the first position to the second position is produced with a speed slower than a speed of a motion to the initial position as produced during a process of bringing the seat posture control to an end.

6. A vehicle seat, comprising:
a seat cushion;
a seat back;
an actuator capable of changing an orientation of the seat back laterally by moving at least part of the seat back;
a controller configured to exercise control over the actuator; and
a pressure-receiving member,
wherein the controller includes a posture control unit configured to execute, during turning of a vehicle, a seat posture control under which the actuator is caused to move the at least part of the seat back from an initial position to a first position to cause the seat back to orient toward a turning direction,
wherein the posture control unit is configured to activate, when an execution time of the seat posture control has become equal to or greater than an execution time threshold value, a control under which the actuator is caused to move the at least part of the seat back from the first position to a second position to reversely change the orientation of the seat back,
wherein the pressure-receiving member is provided to receive a load from an occupant, the pressure-receiving member being disposed between left and right side frames that constitute left and right frames of the seat back, and
wherein the actuator is configured to change the orientation of the seat back laterally by moving the pressure-receiving member.

7. The vehicle seat according to claim 6, wherein the seat back includes a central portion allowing a back of an occupant to rest thereagainst, and side portions disposed at left and right sides of the central portion and jutting frontward farther than the central portion,
wherein a gap formed between the central portion and one of the side portions is greater when the pressure-receiving member is in the second position than when the pressure-receiving member is in the first position.

8. The vehicle seat according to claim 6, wherein an amount of actuation of the actuator between the initial position and the second position is half an amount of actuation of the actuator between the initial position and the first position.

9. The vehicle seat according to claim 6, wherein the posture control unit is configured to reversely change the orientation of the seat back stepwise in accordance with a lapse of the execution time of the seat posture control.

10. The vehicle seat according to claim 6, wherein the second position is between the initial position and the first position.

11. The vehicle seat according to claim 6, wherein the controller includes a lateral acceleration acquisition unit configured to acquire a lateral acceleration, and
wherein the posture control unit is configured to activate, when a magnitude of the lateral acceleration acquired by the lateral acceleration acquisition unit during the turning of the vehicle has become equal to or greater than a first threshold value, a control under which the actuator is caused to move the at least part of the seat back from the initial position to the first position.

12. The vehicle seat according to claim 11, wherein the posture control unit is configured to activate, when a magnitude of the lateral acceleration acquired by the lateral acceleration acquisition unit during the seat posture control has become equal to or smaller than a second threshold value that is smaller than the first threshold value, a control under which the actuator is caused to move the at least part of the seat back to the initial position to thereby bring the seat posture control to an end.

13. The vehicle seat according to claim 4, wherein an amount of actuation of the actuator between the initial position and the second position is half an amount of actuation of the actuator between the initial position and the first position.

14. The vehicle seat according to claim 4, wherein the posture control unit is configured to reversely change the orientation of the seat back stepwise in accordance with a lapse of the execution time of the seat posture control.

15. The vehicle seat according to claim 5, wherein the second position is between the initial position and the first position.

16. The vehicle seat according to claim 5, wherein the controller includes a lateral acceleration acquisition unit configured to acquire a lateral acceleration, and
wherein the posture control unit is configured to activate, when a magnitude of the lateral acceleration acquired by the lateral acceleration acquisition unit during the turning of the vehicle has become equal to or greater than a first threshold value, a control under which the actuator is caused to move the at least part of the seat back from the initial position to the first position.

17. The vehicle seat according to claim 16, wherein the posture control unit is configured to activate, when a magnitude of the lateral acceleration acquired by the lateral acceleration acquisition unit during the seat posture control has become equal to or smaller than a second threshold value that is smaller than the first threshold value, a control under which the actuator is caused to move the at least part of the seat back to the initial position to thereby bring the seat posture control to an end.

18. The vehicle seat according to claim 5, wherein an amount of actuation of the actuator between the initial position and the second position is half an amount of actuation of the actuator between the initial position and the first position.

19. The vehicle seat according to claim 5, wherein the posture control unit is configured to reversely change the orientation of the seat back stepwise in accordance with a lapse of the execution time of the seat posture control.

* * * * *